United States Patent
Oboril et al.

(10) Patent No.: US 12,367,749 B2
(45) Date of Patent: Jul. 22, 2025

(54) ACTIVE VEHICLE SAFETY SYSTEM FOR CYCLISTS AND PEDESTRIANS

(71) Applicant: Intel Corporation, Santa Clara, CA (US)

(72) Inventors: Fabian Oboril, Karlsruhe (DE); Cornelius Buerkle, Karlsruhe (DE); Frederik Pasch, Karlsruhe (DE); Ophir Shabtay, Tzofit (IL)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 17/482,467

(22) Filed: Sep. 23, 2021

(65) Prior Publication Data

US 2022/0012995 A1   Jan. 13, 2022

(51) Int. Cl.
*G08B 21/02*   (2006.01)
(52) U.S. Cl.
CPC ..................... *G08B 21/02* (2013.01)
(58) Field of Classification Search
CPC ........ G08B 21/02; G08B 25/016; B62J 27/00; B62J 45/40; B62J 50/21; B62J 1/00; G08G 1/166
See application file for complete search history.

(56) References Cited

U.S. PATENT DOCUMENTS

| | | | | |
|---|---|---|---|---|
| 9,864,918 B2 * | 1/2018 | Micks | ................ | G06V 40/161 |
| 2010/0131148 A1 * | 5/2010 | Camhi | ................ | B60W 40/09 |
| | | | | 701/31.4 |
| 2019/0047554 A1 | 2/2019 | Vaughn | | |
| 2019/0392713 A1 * | 12/2019 | Crasso | ................ | G08G 1/164 |
| 2023/0096284 A1 * | 3/2023 | Whinnery | ............ | G06F 3/012 |
| | | | | 701/301 |

OTHER PUBLICATIONS

Garmin; "Varia™ RTL515 Radar Tail Light"; https://www.garmin.com/en-us/p/698001; Sports & Fitness Cycling; retrieved on Sep. 23, 2021; 8 pages.

(Continued)

*Primary Examiner* — Daryl C Pope
(74) *Attorney, Agent, or Firm* — Viering, Jentschura & Partner mbB

(57) ABSTRACT

Disclosed herein is an active cyclist and/or pedestrian safety system for identifying, warning, and reacting to dangerous situations that may be experienced by cyclists and/or pedestrians. The safety system may receive first information indicative of a head position of a cyclist and determine, based on the first information, a field of view of the cyclist. The safety system may receive second information indicative of an environment of the cyclist and determine, based on the field of view and the environment, an expected trajectory of the cyclist in a next road segment. The safety system may also determine, based on the field of view and the environment, a risk probability for the expected trajectory of the cyclist in the next road segment. The safety system may also generate an instruction to transmit a warning to the cyclist if the risk probability exceeds a threshold value.

19 Claims, 9 Drawing Sheets

(56) References Cited

OTHER PUBLICATIONS

BOSCH; "Mehr Sicherheit, mehr Stabilitat. BOSCH eBIKE ABS"; https://www.bosch-ebike.com/de/produkte/abs/?gclid=CjwKCAjwz_WGBhA1EiwAUAxlcfddrxQQ2ADHumDOVah0uFVKr3BSD6xcOYGp4aWa6U_2B5fKA_MxxoCZ1MQAvD_BwE#filter%5BabsExpert%5D=1; retrieved on Nov. 16, 2021; 28 pages (including 14 pages for the English translation).

Shai Shalev-Shwartz et al., "On a Formal Model of Safe and Scalable Self-driving Cars", Mobileye 2017, Oct. 27, 2018, 37 pages, arXiv: 1708.06374v6.

Caroline Kingsley et al., "Augmented Riding: Multimodal Applications of AR, VR, and MR to Enhance Safety for Motorcyclists and Bicyclists", HCI International 2020—Late Breaking Papers: Virtual and Augmented Reality, 2020, pp. 356-367, Springer Nature Switzerland AG 2020.

Marie-Christin H. Oczko et al., "Integrating Haptic Signals with V2X-based Safety Systems for Vulnerable Road Users", 2020 International Conference on Computing, Networking and Communications (ICNC): Invited Symposium, Feb. 17-20, 2020, pp. 692-697, IEEE, Big Island, HI, USA.

The Brake Report; "Radar AEB Patented by Harley-Davidson"; https://thebrakereport.com/radar-aeb-patented-by- harley-davidson/; retrieved on Sep. 23, 2021; 8 pages.

Giovanni Savino et al., "Autonomous Emergency Braking For Cornering Motorcycle", 24th International Technical Conference on the Enhanced Safety of Vehicles (ESV), Jun. 2015, 13 pages, Paper No. 15-0220, Gothenburg, Sweden.

Julian Eggert et al., "The Foresighted Driver: Future ADAS Based on Generalized Predictive Risk Estimation", FAST-zero 2015 Symposium, 2015, 9 pages, Honda Research Institute Europe GmbH.

\* cited by examiner

ACTIVE VEHICLE SAFETY SYSTEM FOR CYCLISTS AND PEDESTRIANS

TECHNICAL FIELD

The disclosure relates generally to cyclist and pedestrian safety, and in particular, systems, devices, and methods for identifying, warning, and reacting to dangerous situations that may be experienced by cyclists and pedestrians.

BACKGROUND

Although many of today's vehicles such as automobiles, trucks, busses, and trains include automated safety systems, such systems have not been appropriate for cyclists and pedestrians. Cyclists and pedestrians, often referred to as vulnerable road users, travel in different ways as compared to typical automobiles, trucks, busses, and trains, and determining an unsafe or dangerous situation for automobiles, trucks, busses, and trains may be different for a cyclist and/or pedestrian.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
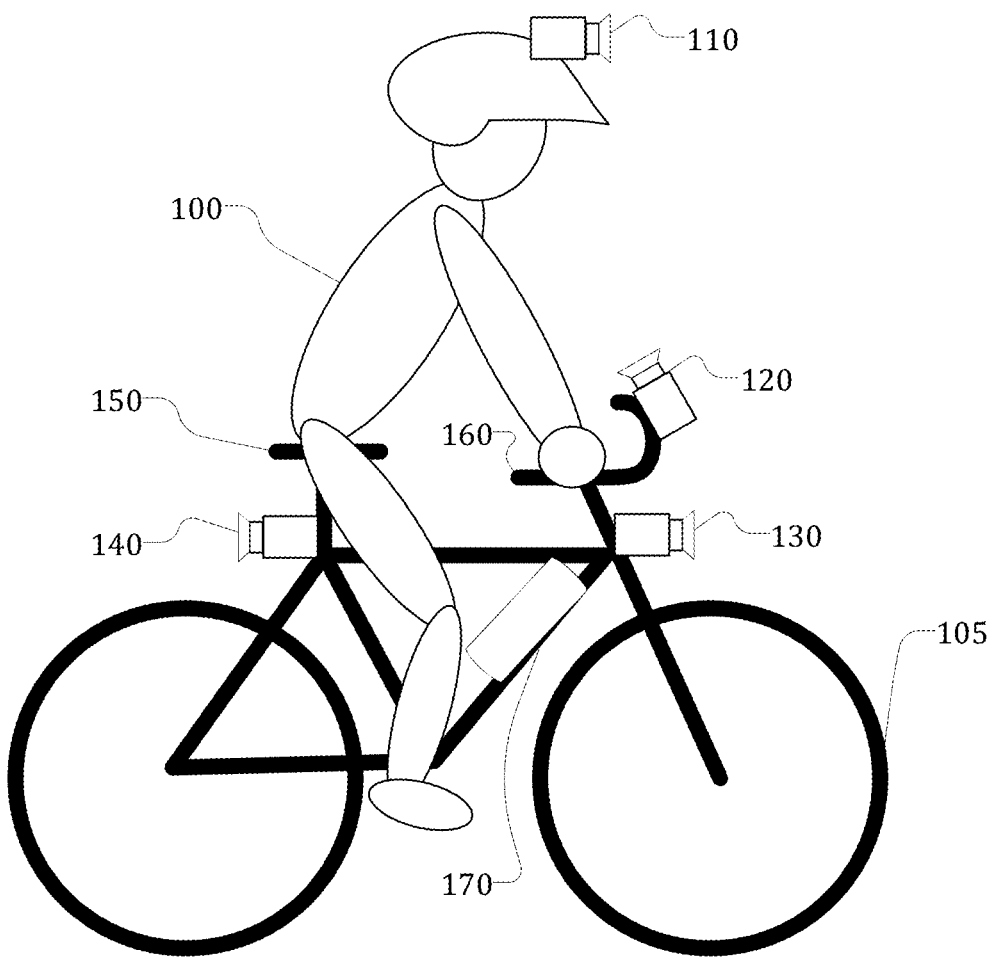
FIG. 1 shows exemplary diagrams of a vehicle traveling on road segments.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D) XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, or a rocket, among others. As used herein, a "cycle" is a subcategory of vehicles, and includes unicycles, bicycles, e-bikes, tricycles, motorcycles, segways, scooters, etc. (e.g., mobility platforms that may be pedal-powered, gas-powered, and/or battery powered). A "cyclist" may be the driver of any such cycle, which includes pedestrians and should be broadly understood as driving vulnerable road users.

The apparatuses and methods described herein may be implemented using a hierarchical architecture, e.g., by introducing a hierarchical prioritization of usage for different types of users (e.g., low/medium/high priority, etc.), based on a prioritized access to the spectrum (e.g., with highest priority given to tier-1 users, followed by tier-2, then tier-3, etc.).

While many vehicles today are equipped with safety monitoring systems that may warn a driver or may assist a driver in reacting to objects that may appear in the vehicle's vicinity, such safety and warning systems have not yet been applied to cycles and pedestrians. Cycles and pedestrians travel in different ways as compared to typical automobiles, trucks, busses, and trains, and therefore determining an unsafe or dangerous situation for automobiles, trucks, busses, and trains may be different for a cycle and/or pedestrian. As a result, current automobile safety systems may be inappropriate or less effective for detecting dangerous situations for cyclists and pedestrians. Moreover, existing systems may be unable to or would be less effective at providing warnings or enforcing safety measures for a cycle or a pedestrian experiencing a dangerous situation. Existing solutions for cyclists and pedestrians, therefore, are often limited to manual protective measures, such as helmets and mirrors.

As should be apparent from the detailed disclosure below, the proposed system is able to detect dangerous situations for cycles and pedestrians, based on, for example, the field of view of the cyclist/pedestrian, the environment in which the cycle is being operated or the pedestrian is moving, a predicted path, and/or the environment of the road/sidewalk ahead. The cycle- and pedestrian-based safety system described below is able to detect dangerous situations for cyclists/pedestrians, and, if appropriate, provide appropriate safety warnings or safely control movements (e.g., slowing/braking the cycle, adjusting the trajectory of the cycle, etc.). Such a system may provide improved cyclist and pedestrian safety by using, for example, sensors (e.g., camera, Light Detection and Ranging (LiDAR), depth cameras, accelerometers, gyroscopes, inertial measurement units, etc.) that may be integrated into the handlebar, frame, seat/saddle, helmets, backpacks, etc. Such systems may also use low-power processing units (e.g. a processor) to predict the expected trajectory of the cycle/pedestrian, perform object detection/tracking, and to identify potentially dangerous situations in the next road segment (e.g., along the path/trajectory of the cycle or pedestrian). Such systems may also include a multi-stage warning system for the cyclist/pedestrian that may, as a first stage, use haptic feedback on the seat/saddle and/or handlebars or provide visual/audio feedback on a bike-computer, screen, smartphone, smartwatch, or speaker. As a second stage, the warning system may also include a passive (e.g., by disabling the motive force (e.g., the electric motor of an e-bike)) and/or active braking system (e.g., by activating the brakes) or other controls for safely adjusting the trajectory of the cycle for safer movements.

FIG. 1 shows a cyclist 100 on a bicycle 105 that has an integrated active safety system. For example, bicycle 105 includes sensors 110, 120, 130, 140 (e.g., camera, Light Detection and Ranging (LiDAR), depth cameras, accelerometers, gyroscopes, inertial measurement units, etc.) that may be integrated into the frame of the bike and may also be integrated in or located on, for example, handlebar 160 and/or saddle 150. Bicycle 105 also includes a processing unit 170 that may provide processing systems (e.g. one or more processors) for predicting the expected trajectory of the cycle/pedestrian, performing object detection/tracking, and identifying potentially dangerous situations in the next road segment. The processing unit 170 may also include communication capabilities (e.g., using vehicle to everything (V2X) protocols, Bluetooth protocols, 802.11 (WiFi) protocols, cellular protocols, ultra low power (ANT/ANT+) protocols, etc.) in order to communicate with other traffic objects and/or cloud-based servers. The processing unit 170 may also include a multi-stage warning system for providing alerts to the cyclist via an integrated audio/video system, via messages to a smartwatch, smartphone, helmet speakers, etc., via haptic feedback to saddle 150 and/or handlebars 160, etc.

As its second stage of the warning system, processing unit 170 may also include a passive braking system that may, for example, disable the motive force (e.g., the electric motor of an e-bike) of the bicycle 105, actively apply the brakes of bicycle 105, and/or turn the handlebars to redirect bicycle 105 along a safer path. Although FIG. 1 shows a cycle (bicycle 105) and a cyclist (cyclist 100), it should be appreciated that similar sensors, processing systems, and warning systems may also be integrated with a pedestrian by, for example, including such systems in a backpack, helmet, or within/attached to clothing of a pedestrian. As noted above, a cycle (including bicycle 105) may be any number of mobility platforms that may be pedal-powered, gas-powered, and/or battery powered, including unicycles, bicycles, e-bikes, tricycles, motorcycles, segways, scooters, etc. Further, the pedestrian should be broadly understood as a vulnerable road user, and when driving a cycle, should be broadly understood as a driving vulnerable road user.

Figure 2:
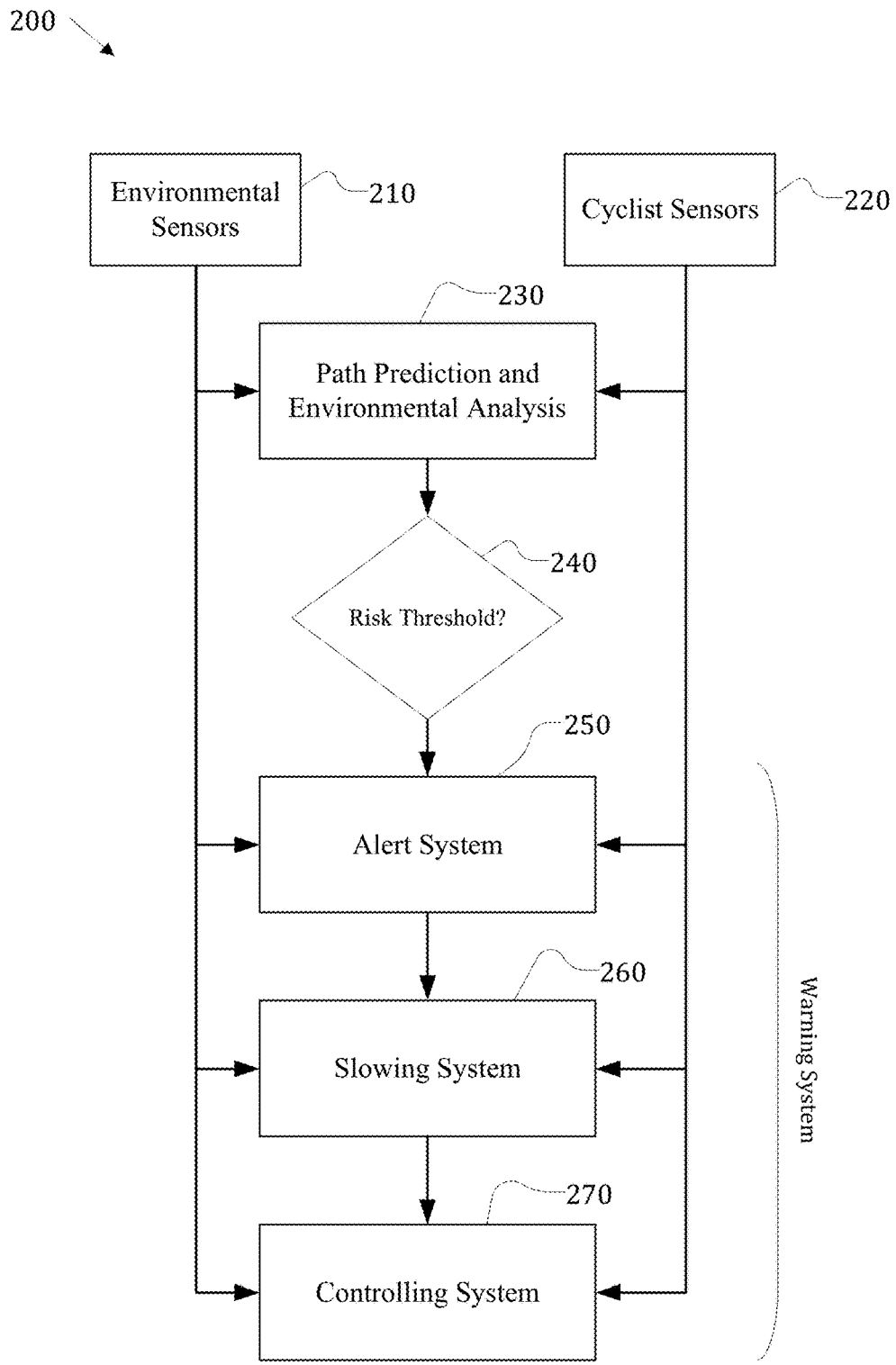
FIG. 2 shows a block diagram of an active safety system that may be integrated into a cycle and/or used by a pedestrian.

FIG. 2 shows a block diagram of an active safety system 200 that may be integrated into a cycle and/or used by a pedestrian. Active safety system 200 may include a sensing subsystem that includes, for example, environmental sensors 210 and/or cyclist sensors 220. These sensors may be, for example, cameras, LiDAR sensors, depth cameras, accelerometers, gyroscopes, inertial measurement units (IMUs), global positioning system (GPS) sensors, etc. Information collected by a sensor may be transmitted or received via wired or wireless connections to other processing units. For example, sensor information may be transmitted using standard communication protocols (e.g., WiFi, Bluetooth, cellular, V2X, or ANT+) to a processor/computer on the cycle and/or in the cloud, where further processing may take place.

As noted above, the sensors may be attached to the frame of the cycle (or to an accessory or clothing of a pedestrian), while other sensors may be integrated, partially or fully, inside the frame of the cycle. For example, a rear-facing camera may be installed inside the seat post of the cycle, which may increase protection of the sensor against bad weather conditions. In addition, external sensors may be used, including, for example, a camera mounted on the helmet of the cyclist or a sensor/camera on the cyclist's smartphone. Another example may be a helmet camera and/or an IMU that is attached to the helmet of the cyclist and may be pointed in the same direction that the cyclist's head is facing. Ideally, though not required, the combined range of all the sensors may achieve a 360° field of view of the environment and the cyclist.

The environmental sensors 210, for example, may collect information about the environment in which the cyclist is traveling and/or is about to travel. Such environmental information may include, for example, the road/sidewalk/path conditions (e.g., wetness, light conditions, etc.), the road/sidewalk/path dimensions (e.g., width, pose, curviness, etc.), position (e.g. geographic location), nearby objects (e.g., vehicles, traffic signs, pedestrians, etc.), and the motion of the cycle (speed, pitch, acceleration, etc.), etc. In addition, environmental sensor information may be received (e.g., using a communication system) from other cycles, other vehicles, other traffic objects, cloud-based servers, etc. that provide map information, traffic information, priority information, additional environmental information from other perspectives, etc. The purpose of collecting such environmental information is to understand what objects may be in the vicinity of the cycle with respect to the current motion of the cycle.

The cyclist sensors 210, for example, may collect information about the attention of the cyclist to the environment. Such cyclist information may include, for example, the head position/tracking of the cyclist, the eye position/tracking of the cyclist, the weight distribution of the cyclist, the body positions of the cyclist on the cycle (e.g., whether both feet are on the pedals, whether both hands are on the handlebars, etc.), the facial expressions of the cyclist, the motion of the cycle (speed, pitch, acceleration, etc.), etc. In addition, cyclist sensor information may be received (e.g., using a communication system) from other cycles, other vehicles, other traffic objects, cloud-based servers, etc. that provide additional cyclist information from other perspectives. The purpose of collecting such cyclist information is to understand the field of view of the cyclist with respect to the current motion of the cycle (e.g., the attention of the cyclist to the cyclist's surroundings). Although the environmental sensors 210 and cyclist sensors 220 have been depicted as separate boxes in FIG. 2 to represent the purpose of obtaining the sensor information, it should be appreciated that the same sensors may be used to supply either, both, or a combination of the two types of information. In addition, the information collected as environmental information may be the same, in whole or in part, as the information collected as cyclist information.

Active safety system 200 may include a path prediction and environmental analysis module 230, into which the information from the environmental sensors 210 and cyclist sensors 220 may be provided. The path prediction and environmental analysis module 230 may use this information to analyze the environment for dangerous situations and to determine an expected trajectory of the cyclist. For example, the path prediction and environmental analysis module 230 may receive, for example, sensor information indicative of a head position of a cyclist, and then use this information to determine a field of view of the cyclist. The path prediction and environmental analysis module 230 may also receive, for example, sensor information indicative of the environment, and then use this information, along with the determined field of view of the cyclist, to determine an expected trajectory of the cyclist. The path prediction and environmental analysis module 230 may use the sensor information indicative of the environment of the cyclist and the determined field of view of the cyclist to determine a risk probability (e.g. a risk score) for the cyclist's expected trajectory in the next road segment.

In addition, the path prediction and environmental analysis module 230 may estimate an expected trajectory (e.g., from a plurality of possible trajectories) for each road segment in which the cycle is currently traveling or is expected to travel. A "road segment" as used herein should be understood to be any portion (divided in any manner) of a road, path, geographic area, etc. on which the cycle is currently traveling or is expected to travel. Based on the expected trajectory of the cyclist and the environmental analysis of the potentially dangerous situation(s) along the expected trajectory, the path prediction and environmental analysis module 230 may determine a risk probably (e.g. a risk score) associated with the environment and trajectory, and in particular, a probability that a dangerous situation exists and about which the cyclist may not be aware. Then, the active safety system 200 may determine, at 240, if the risk probability exceeds a predetermined threshold value, and if so, to take remedial action using a warning system by engaging an alert system 250, a slowing system 260, and/or a controlling system 270 in order to inform the cyclist of the potential danger and/or to reduce the likelihood of an accident.

One aspect of the warning system may include an alert system 250. Alert system 250 may use any number of methods to inform the cyclists of the dangerous situation. For example, the alert system 250 may cause haptic feedback (e.g., vibration) in the saddle and/handlebar to indicate the dangerous situation. As another example, the alert system 250 may cause visual or audio information to be played for cyclist (e.g., placing a picture on a screen, flashing a warning light, outputting sound on a speaker) on a device on the cycle or external to the cycle (e.g., in/on the helmet of the biker, on a smartphone or smartwatch of the cyclist, on a computer of the cycle, on the handlebars, in the seat, etc.).

One aspect of the warning system may include a slowing system 260. Slowing system 260 may use any number of passive methods to slow the speed of the cyclists in order to minimize or avoid the dangerous situation. For example, the slowing system 260 may cause the motive force of the cycle (e.g., an electric motor of an e-bike, a gas engine, etc.) to disengage from the drive train or turn off in order to slow the speed of the cycle.

One aspect of the warning system may include a slowing system 270. The slowing system 270 may use any number of active methods to slow the speed of the cyclists in order to minimize or avoid the dangerous situation. For example, the slowing system 260 may cause the cycle to brake, turn, or switch to a different gear to slow the speed of the cycle and/or to steer clear of the dangerous situation.

Whether the active safety system 200 engages the alert system 250, the slowing system 260, and/or the controlling system 270 may depend on a different threshold for each subsystem, may further depend on information that may be received from the environmental sensors 210 and/or cyclist sensors 220, and may depend on the success of any of the other attempts to inform the cyclist and/or avoid the dangerous situation.

Figure 3:
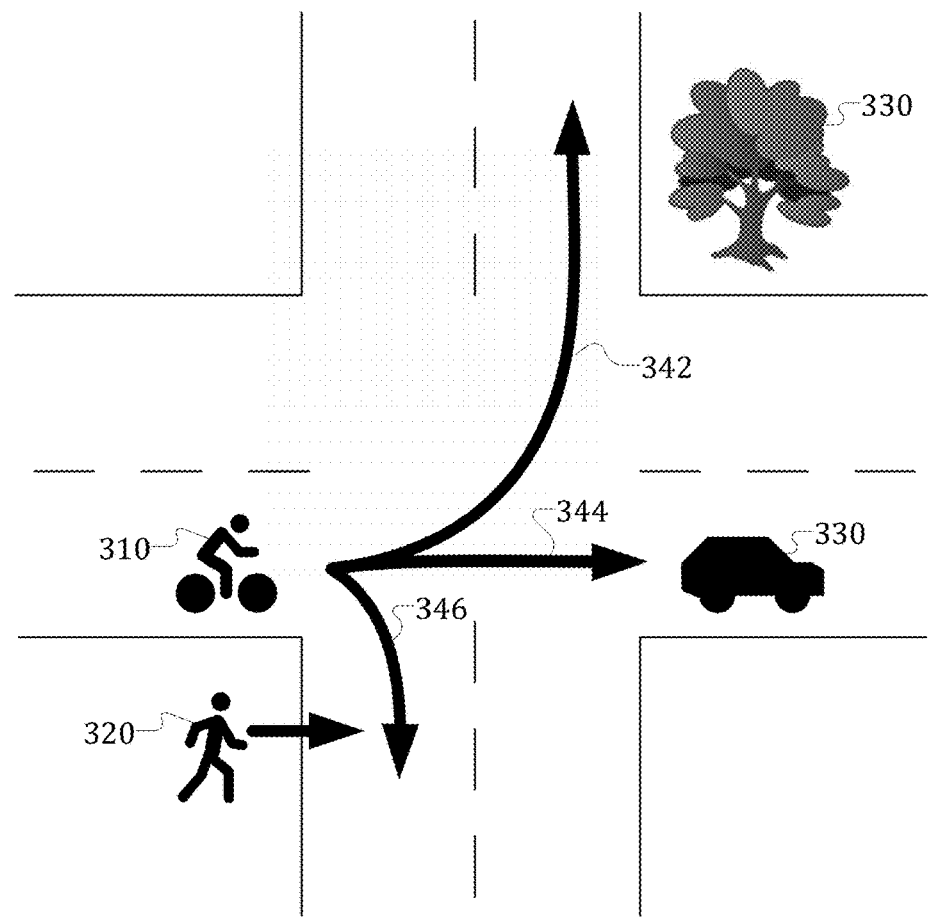
FIG. 3 depicts a cyclist approaching an intersection and three potential paths that the cyclist may follow through the intersection.

Determining the expected trajectory of the cyclist may be difficult because often cyclists do not follow a planned or marked route, even if the destination is known. Thus, determining the intent of the cyclist with regard to the cyclist's future path is not trivial. This challenge is illustrated in FIG. 3, which shows three potential paths (upward path 342, straight path 344, downward path 346) that a cyclist 310 may follow at an intersection. Depending on which potential path is actually chosen by cyclist 310, the risk for a dangerous situation may be different for each path. For example, if the expected trajectory of the cyclist 310 is along upward path 342, the cyclist 310 may encounter three lanes of cross traffic and there is a tree 330 that exists nearby the expected trajectory, which may impact visibility. If the expected trajectory of the cyclist 310 is along straight path 344, the cyclist 310 may encounter two lanes of cross traffic and a vehicle 330 is located directly in front of the cyclist 310, along the expected trajectory. If the expected trajectory of the cyclist 310 is along downward path 346, the cyclist 310 will not face cross traffic but there is a pedestrian 320 that may be crossing the road at a point that is along expected trajectory of the cyclist 310. As should be apparent from this example, each of the different environmental factors associated with each trajectory may be taken into account in order to determine the risk probably for each path. Thus, it is critical to determine the expected trajectory of the cyclist in order for the risk probability to accurately reflect the situation.

Figure 4:
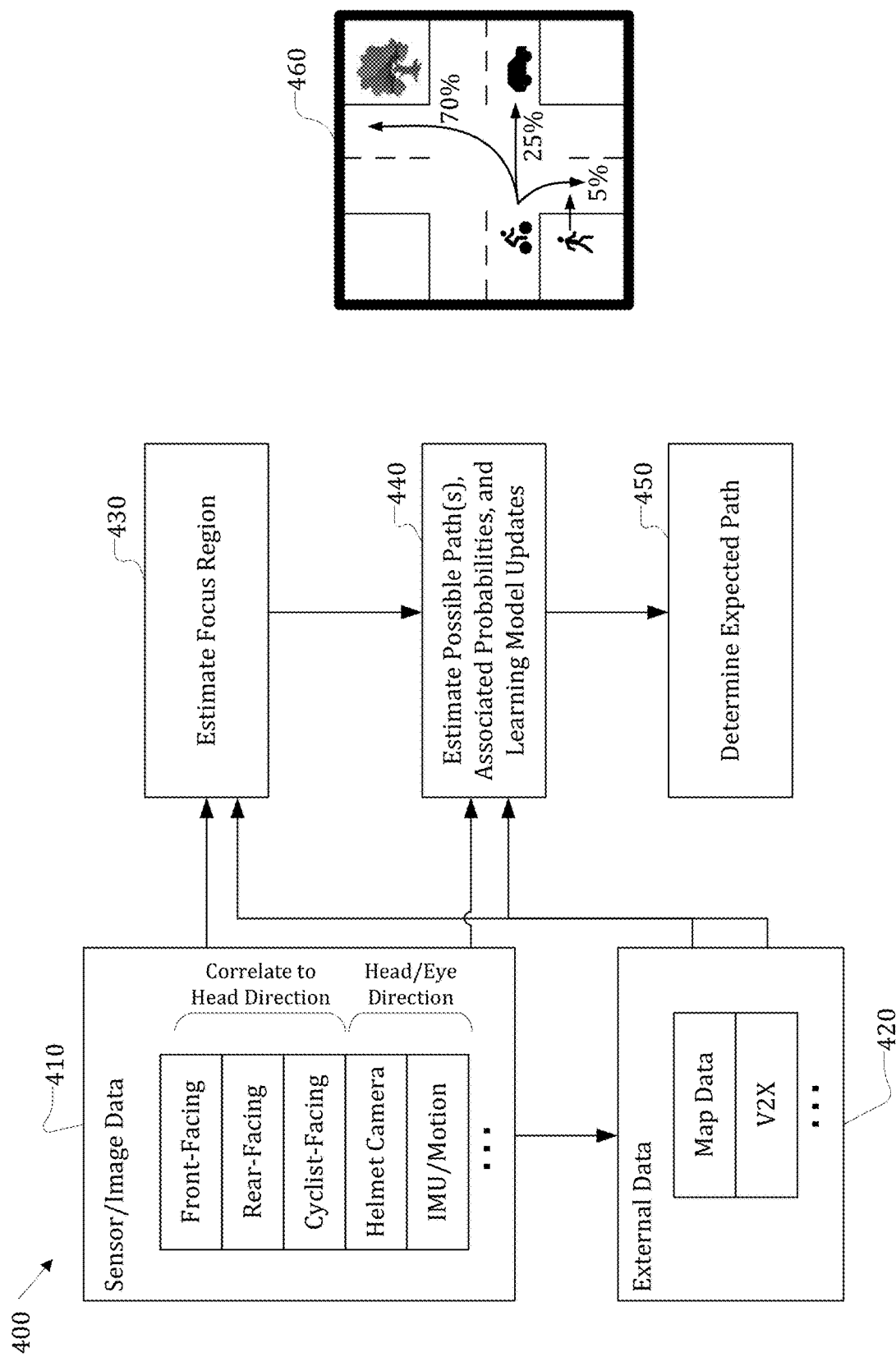
FIG. 4 depicts an exemplary path prediction system for determining the expected trajectory of a cyclist.

FIG. 4 shows an exemplary path prediction system 400 for determining the expected trajectory of a cyclist. Path prediction system 400 may be, for example, part of the path prediction and environmental analysis system 230 and use information from the environmental sensors 210 and/or cyclist sensors 220, discussed above with respect to FIG. 2. As shown in FIG. 4, the path prediction system 400 may use sensor/image data 410 and external data 420 from any number of sensors and sources in order to, in module 430, estimate a focus region of the cyclist. For example, a helmet camera (e.g., a wirelessly-connected, front-facing camera attached to a helmet worn by the cyclist) and/or an IMU attached to the helmet may be used to estimate in which direction the cyclist's head and/or eyes are facing, how frequently, and for what duration over time.

Obtaining this information from a helmet camera and other sensors attached to a helmet may provide particularly robust detection of the direction in which the cyclist is looking. This is because when attached to the helmet, the camera's field of view may correlate to the focus region of the cyclist and the position provided by the IMU may indicate the rotation or movement of the cyclist's head toward the focus region. It should be appreciated that module 430 may use data from other cameras and sensors, including those that are attached to or integrated into the cycle, such as a cyclist-facing camera, a front-facing camera, a rear-facing camera, a side-facing camera, touch sensors, etc. to estimate the focus region (e.g., by correlating the sensor data to a head direction and/or focus region of the cyclist) and to improve the reliability of the estimated focus region. For example, a cyclist-facing camera (e.g., located on the handlebars) may be used in place of or along with a helmet camera to estimate the head track and eye track of the cyclist using images of the head and eyes of the cyclist.

In addition, module 430 may use external data 420 from any number of sensors and sources in order to estimate the focus region. Map data, for example, may be collected from external sources such as a cloud-based server, a computer on the cycle, and/or from a smartphone/smartwatch of the cyclist. The map data may indicate the road geometry, known objects along the road, or other information that may be correlated to other sensor data in order to determine the focus region of the cyclist. For example, objects detected by the cameras in the cyclist's environment may be checked against known landmarks indicated in the obtained map data to see if there is an overlapping focus region. As another example, the sensors may detect whether both hands of the cyclist are contacting the handlebar or other poses of the cyclist to assist in identifying a focus region of the cyclist.

Path prediction system 400 may, in module 440, estimate possible path(s), associated probabilities, and update a learning model using the determined estimated focus region, the sensor/image data 410, and/or the external data 420. The estimated focus region may change over time, and each estimated region of focus may indicate a different possible trajectory for the cyclist. Accordingly, the path prediction system 400 may also determine, in module 440, a score and/or probability associated with each possible trajectory based on any number of factors, including, for example, the amount of time a given focus region was the focus region. For example, the longer a cyclist focuses on a particular region, the more likely it may be that the cyclist's trajectory will be in that direction.

It should be appreciated, however, that numerous other sensor/image data 410 and external data 420 may be used to determine the possible paths and associated probabilities. For example, map data may indicate an intersection is approaching, which would give rise to three possible paths and the duration of time (or number of times/frequency) that the cyclist turns his/or head to or focuses his/her eyes such that the cyclist's focus region is on a particular path, may be an indication that the cyclist is likely to follow a path that includes the frequently focused-on region. As another example, sensor data from a side camera, a motion sensor, and/or a touch sensor may indicate that the cyclist has lifted his/her hand off of one side of the handlebar in order to signal a turn in a particular direction, increasing the probability that that particular direction is the intended trajectory. As another example, data from an accelerometer or IMU may indicate that the cyclist is slowing down and/or leaning to one side in order to make a turn in a particular direction, thus increasing the probability that the particular direction is the intended trajectory. As another example, map data may be used to identify objects of interest, such as a billboard or an attractive building, that may draw the attention of a passing cyclist for reasons other than planning a trajectory, such that frequently focusing in the direction of the object of interest may be discounted as to its probability that this direction is likely to be the intended trajectory.

Module 440 may estimate the likelihood (e.g., a path probability and/or a path score) that any given path may be the expected path using weighted parameters (e.g., probabilities that the estimated focus region, the sensor/image data 410, and/or the external data 420 indicate a particular path). For example, using the duration of the estimated focus region and data associated with sensor data indicating that the cyclist has used his/her arm to indicate a turn, the path score for a given path may be calculated by:

$$S_{pate}=W1*P(\text{path in FoV})*\text{Duration}+W2*P(\text{arm indicates turn})$$

In the above equation, $S_{pate}$ is the path score indicating the extent to which a given possible path is the intended trajectory of the cyclist. As should be appreciated, the path score may also be calculated and expressed as a path probability (e.g., $P_{path}$, a value from 0 to 1 or a percentage from 0% to 100%). P(path in FoV)*Duration is the probability that the path is within the field of view multiplied by the duration of time that path is estimated to be the field of view. P(arm indicates turn) is the probability that the sensor/external data indicates that cyclist has used his/her arm to indicate that path is the intended trajectory. W1 and W2 may be learning model weights applied to the particular parameters, and the sum of the weights (e.g, W1+W2) may, for example, be normalized to 1. In this example, W1 may be the weight associated with the duration and field of view parameter, while W2 may be the weight associated with arm indication parameter. W1 and W2, and any other parameter weights associated with other parameters, may be determined and updated through a learning model as discussed in more detail below.

Using this exemplary calculation on the intersection illustrated in FIG. 3 (reproduced in box 460 of FIG. 4), the score and/or probability for each of the three potential paths (the upwards path, the straight path, and the downward path) may be calculated. If the cyclist has frequently turned her/his head towards left, the helmet camera image data may include the tree, the IMU data may indicate the cyclist has made quick and frequent looks along the leftward path, and other sensor/external data (e.g., a side camera and/or handlebar touch sensors) may indicate a high probability that the cyclist raised his/her left arm to indicate a left turn. In addition, the sensor/external data may indicate that the cyclist never turned his head to the rightward path. In addition, the sensor/external data may indicate that the cyclist's head is mostly faced forward (in the current direction of travel) but that the cyclist's speed is decreasing, even though the distance to the car ahead is increasing. As a result, the score and/or probability of the leftward path, e.g. ($P_{left}$) may be close to 1 (e.g., 70%), while the score and/or probability of the rightward path, e.g. ($P_{right}$), may be close to 0 (e.g., 5%), and the score and/or probability of the straight path, e.g. ($P_{straight}$), may be in the low to mid range (e.g., 25%).

As should be apparent from this example, any number of factors associated with each trajectory (e.g., based on the determined focus point/field of view and/or sensor/external data) may be taken into account in order to determine the path score and/or path probably that a potential trajectory is the expected trajectory. Path prediction system 400 may then use the path scores and/or path probabilities of each path in order to, in module 450, determine the expected trajectory of the cyclist.

Determining the expected trajectory, for example, may be based on (e.g., weighted by) a behavior pattern of the cyclist/pedestrian. As should be appreciated, the behavior pattern of one cyclist may differ from other cyclists, and other environmental factors being equal, the expected trajectory of one cyclist may therefore be different from another cyclist in those same environmental conditions. To account for a cyclist's behaviors, a learning model may be used to improve the estimation performance over time. The learning model may, for example, store a set of common routes (actual movements/trajectories) that have been associated with a cyclist at a given time, such that a time-based input may be correlated with a higher score and/or probability that one of the cyclist's common routes is the expected trajectory (e.g., a cyclist may have a commuting route used at the beginning and end of the work day). Similarly, the learning model may store data that associates the actual trajectory chosen by the cyclist with the environmental and cyclist data captured at that time (e.g., head position, eye position, arm movement, field of view, attention, etc.). Over time, this learning model data may be used to improve the prediction of the expected trajectory of the cyclist. For example, the learning model may determine that a particular cyclist takes a deep breath, shifts his/her weight forward in the saddle, and turns his/her head twice in the direction of a turn rapid succession before making a turn in a particular direction. Thus, by recognizing these actions from the environmental and cyclist data, the learning model may improve the likelihood of estimating the expected trajectory of the cyclist. Such a learning model data may be stored/processed locally and/or received/transmitted from/to a cloud-based server.

The learning model may include any number of parameters and weights associated with each of the parameters (e.g., the relative statistical importance of any particular parameter to the determining the path score, as discussed above with respect to W1 and W2). For example, hand signaling may be a particularly strong predictor of an expected trajectory, so the learning model may give more weight to data associated with hand signaling. As should be appreciated, any of the environmental and cyclist data discussed above may be used with the learning model. A machine learning implementation may be used in order to build and adapt the learning model.

The learning model may be trained using comparisons of the expected trajectory compared to the actual trajectory (e.g., the error), and training the model may depend on how the learning model is implemented. In other words, the path prediction system 400 may use the learning module, in module 450, to determine the expected trajectory of the cyclist. The path prediction system 400 may also use any errors in the determination (e.g., the determined expected trajectory compared to the actual trajectory) to re-train the learning model. Training the learning model may be based on low-computation methods such as through adaptive filtering or a model-based method. Training the learning model may also be based on high-computation methods such as machine-learning methods. A model-based method (and/or a light artificial intelligence network), may be done in real-time. This means that the learning model's parameter weights may be adapted using conventional methods including but not limited to least mean squares (LMS), minimum mean square error (MMSE), gear shift in of adaptive rate, decision feedback methods, maximum likelihood, etc.

With a machine learning method, it may be advantageous to do the training on a cloud-based server and then the re-trained model may be obtained from the cloud. For example, the path prediction system (e.g., path prediction system 400) may use an end-to-end over-the-air (OTA) update to receive an updated learning model from the cloud-based server in order to compress the data to reduce traffic, to encrypt and authenticate the data to maintain security, to protect the privacy of the data, and to security of the client-server transaction. To reduce the need for local processing (e.g., at the cycle or pedestrian), a cloud-based server may perform the processing for the re-training.

Returning to FIG. 2, the path prediction and environmental analysis module 230 may determine a risk probably (e.g., a risk score or safety score) associated with the determined expected trajectory of the cyclist, and in particular, a probability that a dangerous situation exists and about which the cyclist may not be aware. The safety score can be calculated using risk models that estimate the risk associated with loss of control of the cycle or associated with a potential collision. Importantly, the risk model must be from the perspective of the cyclist, and conventional vehicle-based risk/safety models may not be appropriate. For example, conventional vehicle-based models may treat a cyclist like a vulnerable road user (VRU) and apply an unstructured safety model, using a reachable set approach to determine if the constellation of traffic objects is safe or unsafe. From the perspective of a cyclist, however, the safety model may depend on the type of location in which the cycle is currently traveling or expected to be travelling (e.g., in road shared with vehicular traffic, in a bike lane that is next to vehicular traffic, in a bike lane that is separated from vehicular traffic), or in a pedestrian zone. For example, when the cyclist is operating within in a road shared with vehicular traffic (e.g., with or without defined bike lanes), a structured risk/safety model might be used, where the risk probability/safety score may depend on longitudinal and lateral distance checks to other traffic objects. When the cyclist is traveling on a shared sidewalk, however, a reachable set risk/safety model might be used.

Figure 5A:
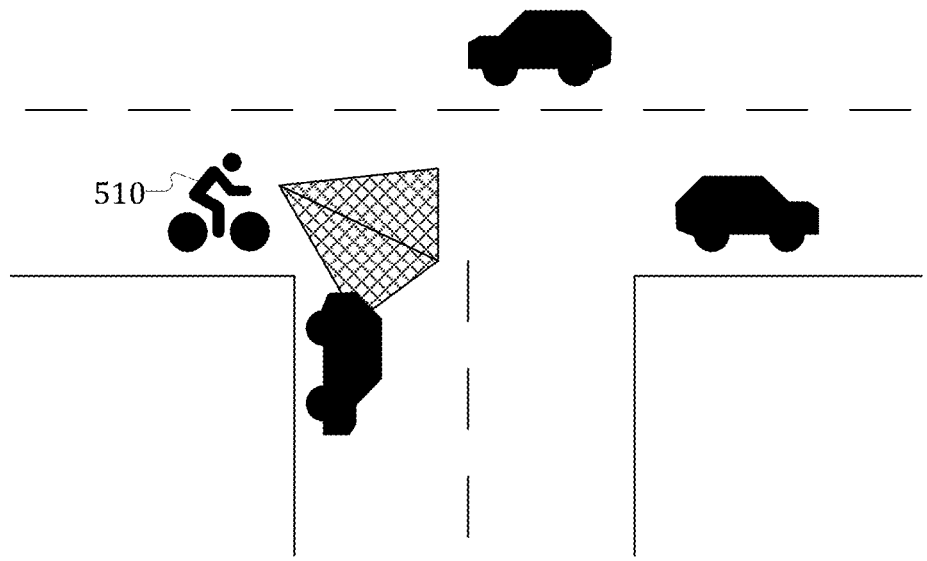
FIGS. 5A-5C show examples of different types of locations/environments in which a cyclist or pedestrian may be traveling.
Figure 5B:
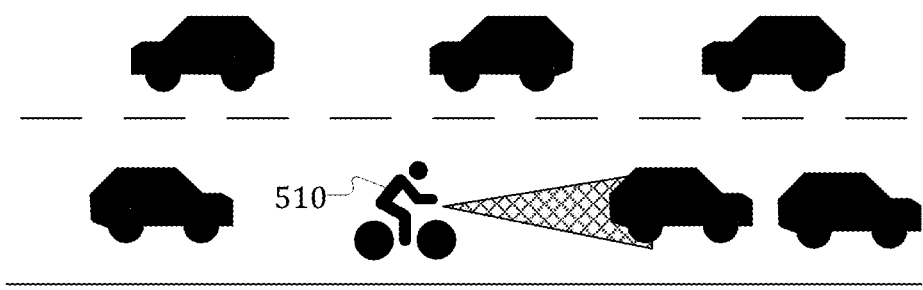
Figure 5C:
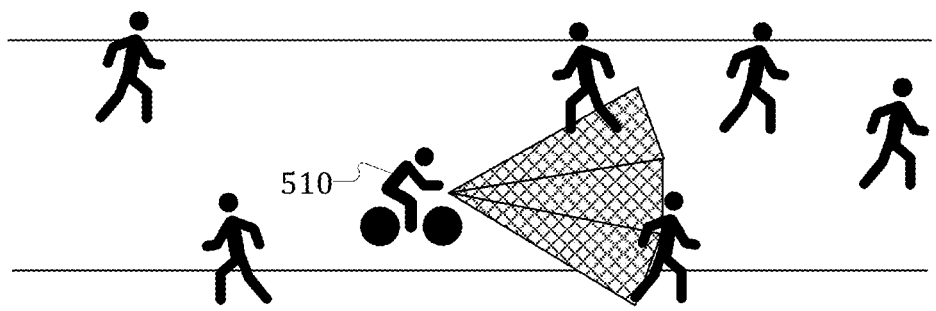

Examples of different types of locations are depicted in FIGS. 5A-5C. FIG. 5A shows cyclist 510 is traveling into an intersection road segment that is shared with a few other vehicles. In FIG. 5B, cyclist 510 is traveling on a busy road segment that is shared with many other vehicles. FIG. 5C shows cyclist 510 traveling on a road segment (e.g. a pedestrian zone or sidewalk), that is shared with many pedestrians. In order to detect the type of environment and switch from one risk/safety model to another, the sensors/external data may be used (e.g., a helmet camera, a front-facing camera, a side-camera, a rear-camera, LiDAR, GPS sensors, map information, V2X messages, etc.) in order to determine what type of location the cycle is currently traveling. For example, if the number of pedestrians detected by the sensors/external data exceeds a certain threshold, an unstructured model may be used, otherwise a structured model may be used.

In addition to a different risk/safety model that may be applied depending on the type of location, the warning system (e.g., the alert system 250, the slowing system 260, and/or the controlling system 270 described above with respect to FIG. 2) may also depend on the type of location in which the cycle or pedestrian is traveling. For example, using the example of FIG. 5B where cyclist 510 is traveling on a busy road segment shared with many vehicles, the cyclist may likely be aware of the traffic, and if so, it might be annoying and counterproductive to provide a warning for each nearby or passing vehicle. As such, the warning system may limit the warnings to a narrow set of situations, for example, where the traffic object (e.g., the vehicle) immediately in front of the biker brakes suddenly.

The situation may be different, however, for the situation depicted in FIG. 5A where cyclist 510 is traveling on an empty road where few other vehicles are expected. In such a location, the warning system may provide more frequent warnings to alert the cyclist when new traffic objects appear nearby. The warning system may also be different for the situation depicted in FIG. 5C where cyclist 510 is traveling in a busy pedestrian area. In such a location, the cyclist may already be aware of nearby pedestrians and may only need warnings when detected traffic objects (e.g., pedestrians, other bikers, etc.) are moving faster than the cyclist, for example, or when traffic objects have an expected/predicted trajectory towards the cyclist. In addition, it may also be appropriated for the warning system to provide a warning if the speed of the cyclist exceeds a threshold value that is appropriate for the given density of traffic objects. For example, a very crowded pedestrian area may be associated with a more conservative warning system (e.g. provide a warning at lower speed threshold), whereas an empty pedestrian area may be associated with a more liberal warning system (e.g., provide a warning at a higher speed threshold).

As another example, the warning system may be distance-based such that if any traffic object comes within a threshold safety distance (e.g., within 1.5-2 meters of the cyclist), the warning system may provide a proximity warning. As noted above with the speed example, the distance-based threshold may depend on the environment, where a relatively empty location may have a higher distance threshold and a relatively crowded location may have a lower distance threshold. In this sense, the warning system may use a parameterized model that uses any number of parameters and associated thresholds, where each set may be based on the type of location, in order to determine whether to provide a warning. In addition, the parameterized model may be modified based on the movement of the cyclist/pedestrian, not only on movement from one type of location (e.g., an empty road) to a different type of location (e.g., a crowded pedestrian zone), but also on how actual movements of the cyclist may be different than what parameterized model expects. In such a case, the model may switch to a more conservative parameter set and provide an alert to the cyclist/pedestrian that the model has changed. As noted earlier with respect to the risk/safety model, any of the sensors/external data may be used to select the types of events that activate the warning system and the selection may be based on, for example, map information, traffic information (e.g., density), camera information, IMU information, etc.

The warning system may check the constellations among the cyclist and the other traffic participants (e.g., vehicles, pedestrians, other cyclists, etc.) and static objects (e.g. street lights, speed bumps, etc.) multiple times, and each time the warning system may use a different parameter set to determine whether a warning should be issued and what type (e.g., an alert, passively slowing, or actively controlling). For example, in the case where a speed bump appears in the next road segment of the cyclist, the distance between the cycle and the approaching obstacle may be monitored to determine if it exceeds a certain threshold. For example, the minimum distance $d_{min}$ may be determined by the following exemplary equation:

$$d_{min} = v\rho + \alpha\rho^2 + \frac{(v + 2\rho\alpha)^2}{2\beta}$$

In the equation above, p is the reaction time of the cyclist, which may be adapted based on the cyclists awareness of the situation, v is the current velocity of the cyclist, a is the maximum acceleration of the cyclist (for this value, an estimate may be used, which may be a worst-case estimate), and is the deceleration of the cyclist.

As noted above with respect to FIG. 2, the system may use a multi-staged warning system that may include an alert system (e.g., alert system 250), a slowing system (e.g., slowing system 260), and/or a controlling system (e.g., controlling system 270), and engagement of each stage may be based on different thresholds. For example, at an early threshold, the warning system may first provide an alert to the cyclist, and then at a later second-stage threshold (if the dangerous situation still exists) turn off the motive force of the cyclist (e.g. disengage the e-motor in case of an e-bike), and then, at a later third-stage threshold, (if the dangerous situation still exists), control/instruct the cycle to apply brakes. The different thresholds may depend on, referencing the exemplary equation above, different values of β. For example, the alert system may send an alert when the distance to an object exceeds $d_{min}$, set with $$\beta = 1\frac{m}{s^2}.$$

The slowing system may disengage the motive force of the cycle when the distance to an object exceeds $d_{min}$, set with $$\beta = 3\frac{m}{s^2}.$$

The controlling system may disengage the motive force of the cycle when the distance to an object exceeds $d_{min}$, set with $$\beta = 4\frac{m}{s^2}.$$

Using increased thresholds for the slowing and/or controlling system as compared to the alert system ensures that the cyclist first receives an alert before applying a countermeasure (e.g., passively disengaging the motor, actively applying the brakes, etc.).

As noted above with respect to the exemplary equation for $d_{min}$, the reaction time, p, may depend on the cyclist's awareness of the situation. More generally, whether the system engages an aspect of the warning system (e.g., alert system 250, slowing system 260, and/or controlling system 270), may be based on the cyclist's awareness of the situation. The system may determine the cyclist's awareness of the situation using any of the sensor/external data discussed above. For example, a cyclist-facing camera may be used to monitor the cyclist head direction, eye direction, head tracking, eye tracking, etc. and may correlate this with other information to determine the area of attention of the cyclist, and thus whether the cyclist is aware of critical area of the environment (e.g., the area of the dangerous event/object) or whether the cyclist is distracted. As another example, a helmet camera and/or an IMU on the helmet may be used to estimate an area of attention of the cyclist. Depending on the percentage overlap of the cyclist's area of attention with the critical area related to the dangerous event/object, an awareness score may be calculated and used to scale the reaction time. Examples of such reaction time scaling factors are provided in the table below, though other scaling factors may be used and for any number of percentages:

| Percent Overlap | Scaling Factor |
|---|---|
| 100% | 1.0 |
| 50% | 2.0 |
| 0% | 4.0 |

Using the examples in the table above, if the overlap in the cyclist's area of attention with the critical area is 100%, this may indicate it is highly likely that the cyclist is fully aware of the dangerous event/object associated with the critical area. As such, the scaling factor may be set to 1.0, and the baseline response time may be used without scaling. Thus, if the baseline response time is 1 second, then 1 second may be used as the expected reaction time and to determine whether to engage the warning system. On the other hand, if the overlap in the cyclist's area of attention with the critical area is just 50%, this may indicate that only a part of the dangerous event is within the area of attention of the cyclist. As such, the scaling factor may be set to 2.0. Thus, if the baseline response time is 1 second, then 2 seconds may be used as the expected reaction time and to determine whether to engage the warning system. In addition to percentage overlap, it should be appreciated that any number of other parameters may be taken into account that may impact the scaling factor, and ultimately, whether to engage the warning system. It should also be appreciated that the warning system may be used to detect any type of dangerous event/object, and such events are not limited to object detection. For example, the dangerous event may be a pothole, wet road conditions, etc., and the dangerous events may be detected using data from any of the environmental sensors, cyclist sensors, and/or external sources described above.

The multi-staged warning system (e.g., the alert system 250, slowing system 260, and/or controlling system 270 discussed above with respect to FIG. 2) may implement the alert system (e.g., alert system 250) in any number of ways in order to alert the cyclist/pedestrian to the particular dangerous event/object. For example, the cycle may have haptic devices inside the handlebar/grips and/or the saddle/seat that start to vibrate as an alert. The alert may be directional in that, for example, only one side or portion of the handlebar or saddle vibrates so as to indicate the direction of the dangerous situation. In addition, the frequency, intensity, and/or amplitude of the vibration may be adapted to reflect the severity, proximity, and/or type of dangerous a situation.

Figure 6A:
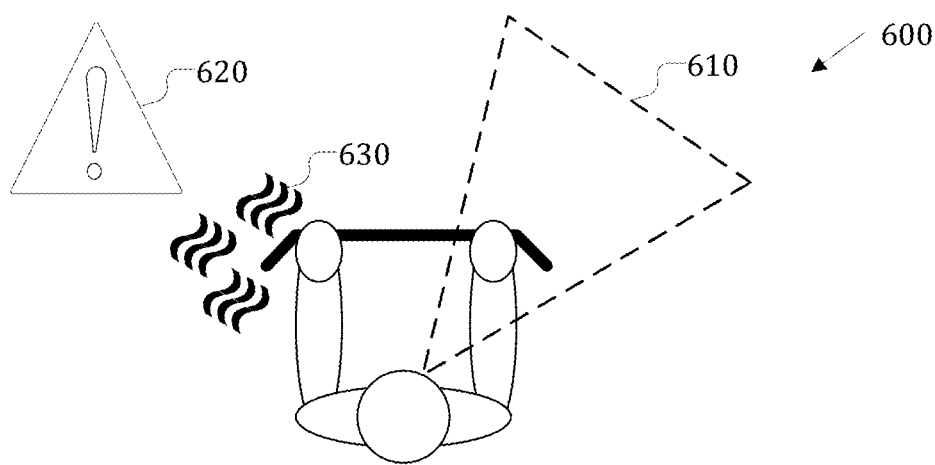
FIGS. 6A and 6B depict examples of a safety alert system that engage differently depending on the situation.
Figure 6B:
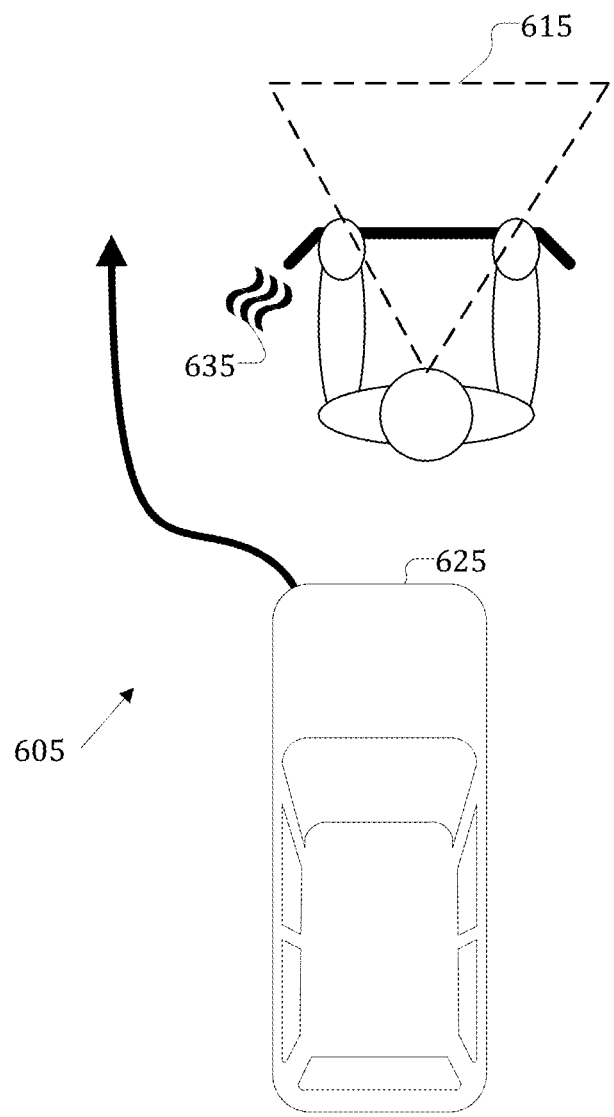

For example, FIGS. 6A and 6B show examples of how different alert systems may engage differently, depending on, as examples, the severity/type of event and cyclist awareness. FIG. 6A shows a scene 600 where the cyclist's field of view 610 (e.g., area of attention) is slightly to the right. While the cyclist's field of view 610 is to the right, the system has detected a highly dangerous event 620 to the left. Because the cyclist's field of view 610 is to the right, the cyclist may be unaware of the event. Thus, the alert system may cause an alert to be triggered on the left handlebar, using intense and frequent vibrations 630 to alert the cyclist of the highly dangerous event 620. FIG. 6B shows a scene 605 where the cyclist's field of view 615 (e.g., area of attention) is along the direction of travel, and the cyclist appears to be undistracted. A vehicle 625 is approaching from the rear and appears to have a normal and safe trajectory to overtake the cyclist. To alert the cyclist to the passing vehicle, the alert system may cause an alert to be triggered on the left handlebar and/or in the back of the saddle (not shown), using vibrations 635. Because the cyclist appears to be attentive to the situation and vehicle 625 does not pose a particularly severe danger, the vibrations 635 may be less intense and/or less frequent than, for example, those discussed with respect to FIG. 6A.

In addition, the alert system may provide alerts to other systems or devices (e.g., a smartphone/smartwatch of the cyclist/pedestrian, a computer on the cycle, a heads-up-display on a helmet, on the cycle, or in eyewear), in order to display information about the dangerous situation (e.g., a picture of an object associated with the dangerous situation). To generate the displayed information, the alert system may use and/or combine any of the data from any of the sensors, internal or external. For example, an image captured by a camera on the cycle may be highlighted to identify the critical object or display a trajectory of an approaching object. In addition, the alert system may cause an audible alert to be played on the cycle or other systems/devices (e.g., speakers on the cycle, headphones, a smartphone/smartwatch, helmet). Alerts may be delivered using wired or wireless connections, using protocols such as WiFi, Bluetooth, cellular, etc.

In should be appreciated that in addition to providing an alert, the alert system may also provide a mitigation strategy. For example, an alert message might include information about an appropriate action that may mitigate the risk. For example, the alert message may include text, such as "Brake!", or include augmenting, such as highlighting, to show a recommend safe path on a displayed picture. In addition, the alert may also include information about other safety aspects, such as, reminding the cyclist to place both hands on the handlebars, to slow down, or to pay attention when the cyclist approaches a particular situation such as, for example, a turn in the road (e.g., a dangerous corner), a speedbump, or a school zone.

In addition, the alert system may also provide alerts for other traffic objects. For example, lights of the cycle/pedestrian may be used to inform other traffic objects that they may be causing a dangerous situation. Assume, for example, that a vehicle drives very close to a cyclist. The environmental analysis system may indicate that this vehicle has created a dangerous situation for the cyclist, so the alert system may then cause the lights to start blinking in order to inform the vehicle driver (and potentially other vehicles) that it has approached the cyclist at an unsafe distance.

In addition, the alert system may also issue an emergency call/message to an emergency response center, such as an emergency dispatcher, a fire department, a police department, and/or a hospital, in the event that the system detects that the cyclist/pedestrian has been involved in an actual accident. In should be appreciated that the system may transmit the emergency call/message using any type of connection that may be available through a smartphone/smartwatch, a cycle computer, a V2X interface, etc.

In addition to the alert system (e.g., the alert system 250 discussed above with respect to FIG. 2), the multi-staged warning system may also trigger passive actions (e.g., slowing system 260 discussed above with respect to FIG. 2) and/or active actions (e.g., the controlling system 270 discussed above with respect to FIG. 2) in order to mitigate the risk of the dangerous event with any number countermeasures. As discussed above, these actions (passive or active) may be triggered depending on whether the potential risk meets or exceed a threshold condition.

In the case where the system triggers active actions (e.g., actively braking or actively steering) it may be important to ensure that the countermeasure does not itself create an unsafe situation. For example, a braking action may need to be forceful enough to reduce the speed, but not too forceful so as to cause the tires to lock and create a loss of control situation for the cyclist. To ensure that the active actions are themselves safe, sensors and external data may be used to monitor the environment and the motion of the cyclist in order to determine a risk that the remedial action will cause a loss of control. For example, an IMU sensor (e.g., integrated into the cycle, as part of a cycle computer, as part of a smartphone, attached to the helmet, etc.) may be used to detect accelerations of the cyclist in any direction. If the system detects a threshold level of acceleration or a particular slip angle, the controlling system may not trigger the active action.

In addition, other data may be used to determine whether it is safe to trigger the active action. For example, if a touch sensor in the handlebar indicates that the cyclist has only one hand (or no hands) on the handlebar, the controlling system may decline to trigger an active braking action in order to avoid causing a loss of control. As further examples, other sensors/external data may provide information about the road geometry (e.g., slope of the road detected by an IMU), the road quality/friction (e.g., whether the road is wet/dry or whether there is road damage or a pothole detected by a camera), the motion of the cyclist (e.g., speed or acceleration detected by an IMU and/or GPS), the pose of the cyclist (e.g., the sitting position of the cyclist detected by pressure sensors), and the type of cycle (e.g., the type of brakes provided from a cycle database) in order to determine whether to trigger the action. Ultimately, the controlling system may compare the risk of the dangerous event (e.g., its severity and likelihood) with the risk of control loss that may be caused by the mitigating action (e.g. the active braking), and only if there is a threshold difference between the two (e.g., the risk of the dangerous event is significantly greater than the risk of control loss), will the controlling system trigger the active action. In addition, the controlling system may use an optimization loop that compares the risk of the dangerous event with the risk of control loss in order to find a safe value for the mitigating action (e.g. to determine a safe braking force).

Figure 7:
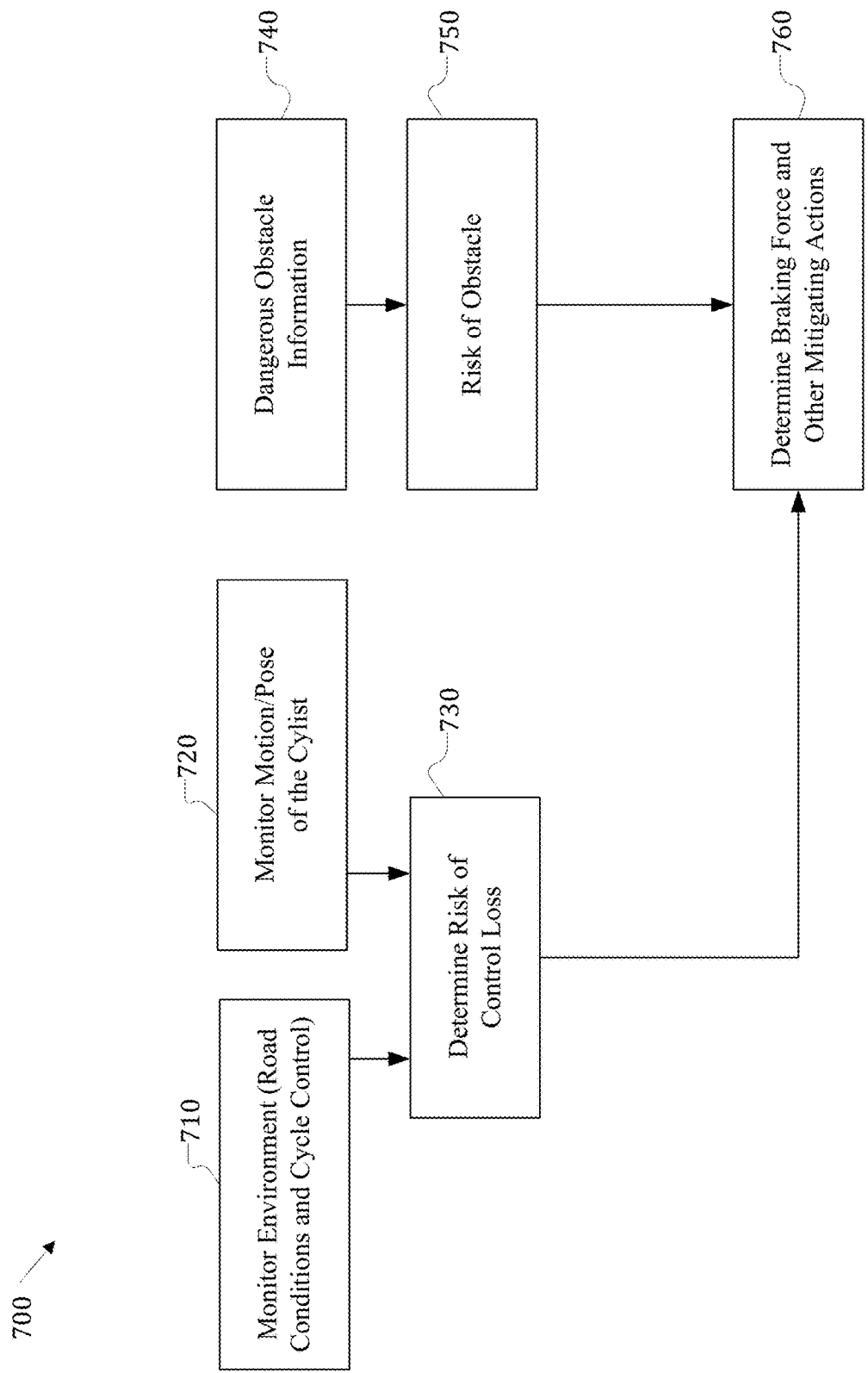
FIG. 7 shows an exemplary risk comparison that may be performed by a controlling system to trigger a mitigating action.

One example of this risk comparison is shown in FIG. 7, which shows exemplary risk comparison 700 that may be performed by a controlling system (e.g., the controlling system 270 discussed above with respect to FIG. 2) that may trigger a mitigating braking action. The risk comparison 700 may monitor, in 710, the environment in which the cycle is traveling to obtain information about the road conditions (e.g., potholes, wetness, etc.) and, in 720, the motion/pose of the cycle and cyclist (e.g., handlebar control, sitting position, role/pitch/yaw, speed, acceleration, etc.) in order to obtain data that may be relevant to determining, in 730, the risk (e.g., the severity and likelihood) of control loss of the cycle if a particular mitigating action (e.g., braking) is implemented. As explained earlier, sensors and external sources (e.g., cameras, LiDAR, IMUs, V2X messages, map data, etc.) may be used to monitor the environment and the cyclist in order to obtain relevant data.

The risk comparison 700 may also receive, in 740, information about a dangerous obstacle that has been detected by an environmental analysis module (e.g., by the path prediction and environmental analysis module 230 described above with respect to FIG. 2). Next, risk comparison 700 may receive or calculate, in 750, the risk (e.g., the severity and likelihood) associated with the dangerous obstacle. Next, the risk associated with the dangerous obstacle is compared, in 760, to the risk of control loss due to the mitigating action. In one example, the mitigating action may be a braking action, the risk comparison 700 determines, in 760, whether it is safe to implement a braking action, and if so, at what braking force. Ideally, risk comparison 700 determines the braking force at a threshold level where the risk of control loss due to braking is less than the risk associated with the dangerous obstacle.

It should be appreciated that FIG. 7 is just one example, and the system may compare risks for any type of mitigating action and determine safe values for implementing other mitigating actions. For example, active steering may also be a mitigating action, where a small motor in the steering post of the cycle may be triggered to turn the wheel to steer away from, for example, an approaching object. In addition, mitigating actions may be combined in order to minimize the risk of a dangerous situation. For example, if the system detects a dangerous situation in the form of a slippery gravel road where the cyclist has already started to lose control. The system may trigger a series of steering and braking actions in order to stabilize the cycle. It should also be appreciated that instead of determining and comparing risks in real-time, risks and comparisons may be located in a look-up table that will provide braking forces and values for implementing other mitigating actions that are appropriate for the given constellation of risks. A look-up method may be particularly helpful when the real-time processing capability of the cycle is limited.

Figure 8:
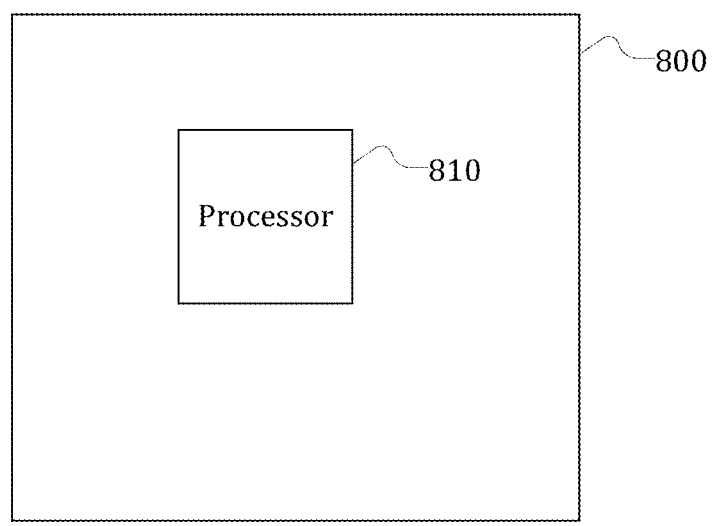
FIG. 8 illustrates a schematic drawing of an apparatus that actively monitors and reacts to the safety of the situation of a cyclist and/or pedestrian.

FIG. 8 is a schematic drawing illustrating an apparatus 800 for actively monitoring and reacting to the safety of the situation of a cyclist and/or pedestrian. The apparatus 800 may include any of the safety system features described above with respect to, as examples, the active safety system of FIG. 1, active safety system 200 of FIG. 2, path prediction system 400 of FIG. 4, and/or risk comparison 700 of FIG. 7. FIG. 8 may be implemented as an apparatus, a method, and/or a computer readable medium that, when executed, performs the features of the safety systems described above. It should be understood that apparatus 800 is only an example, and other configurations may be possible that include, for example, different components or additional components.

Apparatus 800 includes a processor 810. In addition or in combination with any of the features described in the following paragraphs, the processor 810 of apparatus 800 is configured to receive first information indicative of a head position of a cyclist. Processor 810 is also configured to determine, based on the first information, a field of view of the cyclist. Processor 810 is also configured to receive second information indicative of an environment of the cyclist. Processor 810 is also configured to determine, based on the field of view and the environment, an expected trajectory of the cyclist in a next road segment. Processor 810 is also configured to determine, based on the field of view and the environment, a risk probability for the expected trajectory of the cyclist in the next road segment. Processor 810 is also configured to generate an instruction to transmit a warning to the cyclist if the risk probability exceeds a threshold value.

Furthermore, in addition to or in combination with any one of the features of this and/or the preceding paragraph with respect to apparatus 800, processor 810 may be further configured to determine the expected trajectory of the cyclist based on a duration of time the field of view is along a possible trajectory of the cyclist. Furthermore, in addition to or in combination with any one of the features of this and/or the preceding paragraph with respect to apparatus 800, processor 810 may be further configured to determine the expected trajectory of the cyclist based on a posture of the cyclist indicating a possible trajectory of the cyclist. Furthermore, in addition to or in combination with any one of the features of this and/or the preceding paragraph with respect to apparatus 800, the posture may include a head rotation of the cyclist toward a possible trajectory of the cyclist. Furthermore, in addition to or in combination with any one of the features of this and/or the preceding paragraph with respect to apparatus 800, the posture may include an arm signal of the cyclist indicating a possible trajectory of the cyclist. Furthermore, in addition to or in combination with any one of the features of this and/or the preceding paragraph with respect to apparatus 800, processor 810 may be further configured to determine the expected trajectory of the cyclist based on received map information associated with a geographic location of the cyclist and/or a possible trajectory of the cyclist.

Furthermore, in addition to or in combination with any one of the features of this and/or the preceding two paragraphs with respect to apparatus 800, processor 810 may be further configured to correlate the map information with the first information to estimate a focus probability that the cyclist is focused on the expected trajectory. Furthermore, in addition to or in combination with any one of the features of this and/or the preceding two paragraphs with respect to apparatus 800, processor 810 may be further configured to determine the expected trajectory of the cyclist based on information indicative of at least one of a direction of travel of the cyclist, a speed of the cyclist, and/or an acceleration of the cyclist. Furthermore, in addition to or in combination with any one of the features of this and/or the preceding two paragraphs, apparatus 800 may further include a receiver configured to wirelessly receive the first information and/or the second information. Furthermore, in addition to or in combination with any one of the features of this and/or the preceding two paragraphs with respect to apparatus 800, the receiver may be configured to wirelessly receive the first information and/or the second information using at least one of a V2X protocol, a WiFi protocol, and/or a Bluetooth protocol.

Furthermore, in addition to or in combination with any one of the features of this and/or the preceding three paragraphs, apparatus 800 may further include a transmitter configured to wirelessly transmit the warning. Furthermore, in addition to or in combination with any one of the features of this and/or the preceding three paragraphs with respect to apparatus 800, processor 810 may be further configured to determine a plurality of possible trajectories for the cyclist and, for each possible trajectory of the plurality of possible trajectories, determine a path score and/or probability associated with the possible trajectory, and determine the next road segment and the expected trajectory based on the path scores and/or probabilities. Furthermore, in addition to or in combination with any one of the features of this and/or the preceding three paragraphs with respect to apparatus 800, processor 810 may be further configured to determine, for each possible trajectory of the plurality of possible trajectories, a risk score associated with the possible trajectory, wherein the risk score may be based on the field of view of the cyclist. Furthermore, in addition to or in combination with any one of the features of this and/or the preceding three paragraphs with respect to apparatus 800, the risk score may be based on a safety model associated with the environment, wherein the safety model may include an unstructured safety model or a structured safety model. Furthermore, in addition to or in combination with any one of the features of this and/or the preceding three paragraphs with respect to apparatus 800, the risk score may be based on at least one of a number of objects in the environment, a distance of the cyclist from the objects, a speed of the objects, a trajectory of the objects, an acceleration of the objects, the expected trajectory of the cyclist, a speed of the cyclist, an acceleration of the cyclist, and/or a road geometry of the next road segment.

Furthermore, in addition to or in combination with any one of the features of this and/or the preceding four paragraphs with respect to apparatus 800, the risk probability may be further based on a learning model associated with the cyclist, wherein the learning model may be based on comparisons of the expected trajectory to an actual movement of the cyclist over a plurality of road segments. Furthermore, in addition to or in combination with any one of the features of this and/or the preceding four paragraphs with respect to apparatus 800, the learning model may include at least one of a data-based learning model and/or a formula-based learning model. Furthermore, in addition to or in combination with any one of the features of this and/or the preceding four paragraphs with respect to apparatus 800, processor 810 may be further configured to receive the learning model from a cloud-based server or to transmit the comparisons to the cloud-based server. Furthermore, in addition to or in combination with any one of the features of this and/or the preceding four paragraphs with respect to apparatus 800, processor 810 may be further configured to determine an awareness score of the cyclist based on a focus point of the cyclist, wherein the focus point may be based on at least one of the field of view of the cyclist, a head position of the cyclist, and/or an eye position of the cyclist.

Furthermore, in addition to or in combination with any one of the features of this and/or the preceding five paragraphs with respect to apparatus 800, the awareness score may include an expected response time of the cyclist, wherein the expected response time may be based on a correlation of the focus point with the expected trajectory. Furthermore, in addition to or in combination with any one of the features of this and/or the preceding five paragraphs with respect to apparatus 800, the risk probability may be associated with a detected object within the expected trajectory. Furthermore, in addition to or in combination with any one of the features of this and/or the preceding five paragraphs with respect to apparatus 800, the first information may include a camera image associated with a head position of the cyclist. Furthermore, in addition to or in combination with any one of the features of this and/or the preceding five paragraphs with respect to apparatus 800, processor 810 may be further configured to receive the camera image from a forward-facing camera aligned with the head position of the cyclist. Furthermore, in addition to or in combination with any one of the features of this and/or the preceding five paragraphs with respect to apparatus 800, processor 810 may be further configured to receive the camera image from a cyclist-facing camera that faces the cyclist.

Furthermore, in addition to or in combination with any one of the features of this and/or the preceding six paragraphs with respect to apparatus 800, the second information may include sensor information received from a sensor of the cyclist, wherein the sensor may include at least one of a back-facing sensor configured to sense an area behind the cyclist, a front-facing sensor configured to sense an area in front of the cyclist, a body sensor configured to sense a pose, position, and/or a touch location of the cyclist, and/or a side-facing sensor configured to sense an area beside the cyclist. Furthermore, in addition to or in combination with any one of the features of this and/or the preceding six paragraphs with respect to apparatus 800, the sensor may include at least one of a camera, a light detection and ranging sensor, a radar sensor, a positioning sensor, a touch sensor, an accelerometer, a magnetometer, and/or a gyroscope. Furthermore, in addition to or in combination with any one of the features of this and/or the preceding six paragraphs with respect to apparatus 800, the warning may include at least one of a visual indication, an audible indication, and/or a haptic feedback configured to alert the cyclist of the risk probability. Furthermore, in addition to or in combination with any one of the features of this and/or the preceding six paragraphs with respect to apparatus 800, the warning may include a movement instruction configured to respond to the risk probability.

Furthermore, in addition to or in combination with any one of the features of this and/or the preceding seven paragraphs with respect to apparatus 800, the movement instruction may include an instruction to slow a speed of the cyclist in the next road segment. Furthermore, in addition to or in combination with any one of the features of this and/or the preceding seven paragraphs with respect to apparatus 800, the instruction may be configured to disable a motive force associated with the cyclist. Furthermore, in addition to or in combination with any one of the features of this and/or the preceding seven paragraphs with respect to apparatus 800, the instruction may be configured to apply a brake associated with the cyclist. Furthermore, in addition to or in combination with any one of the features of this and/or the preceding seven paragraphs with respect to apparatus 800, the movement instruction may include an instruction to turn a steering mechanism associated with the cyclist.

Furthermore, in addition to or in combination with any one of the features of this and/or the preceding eight paragraphs with respect to apparatus 800, the movement instruction may depend on the risk probability and a control loss factor associated with the environment. Furthermore, in addition to or in combination with any one of the features of this and/or the preceding eight paragraphs with respect to apparatus 800, the control loss factor may depend on a measured deceleration of the cyclist in response to the movement instruction. Furthermore, in addition to or in combination with any one of the features of this and/or the preceding eight paragraphs with respect to apparatus 800, the control loss factor may depend on a posture of the cyclist. Furthermore, in addition to or in combination with any one of the features of this and/or the preceding eight paragraphs with respect to apparatus 800, the control loss factor may depend on a road condition of the next road segment. Furthermore, in addition to or in combination with any one of the features of this and/or the preceding eight paragraphs with respect to apparatus 800, the road condition may include at least one of a road damage to the next road segment, a wetness level of the next road segment, and/or a geometry of the next road segment. Furthermore, in addition to or in combination with any one of the features of this and/or the preceding eight paragraphs with respect to apparatus 800, the cyclist may include a pedestrian operating a bicycle. Furthermore, in addition to or in combination with any one of the features of this and/or the preceding eight paragraphs with respect to apparatus 800, the bicycle may be an electric bicycle or a motorized bicycle.

Figure 9:
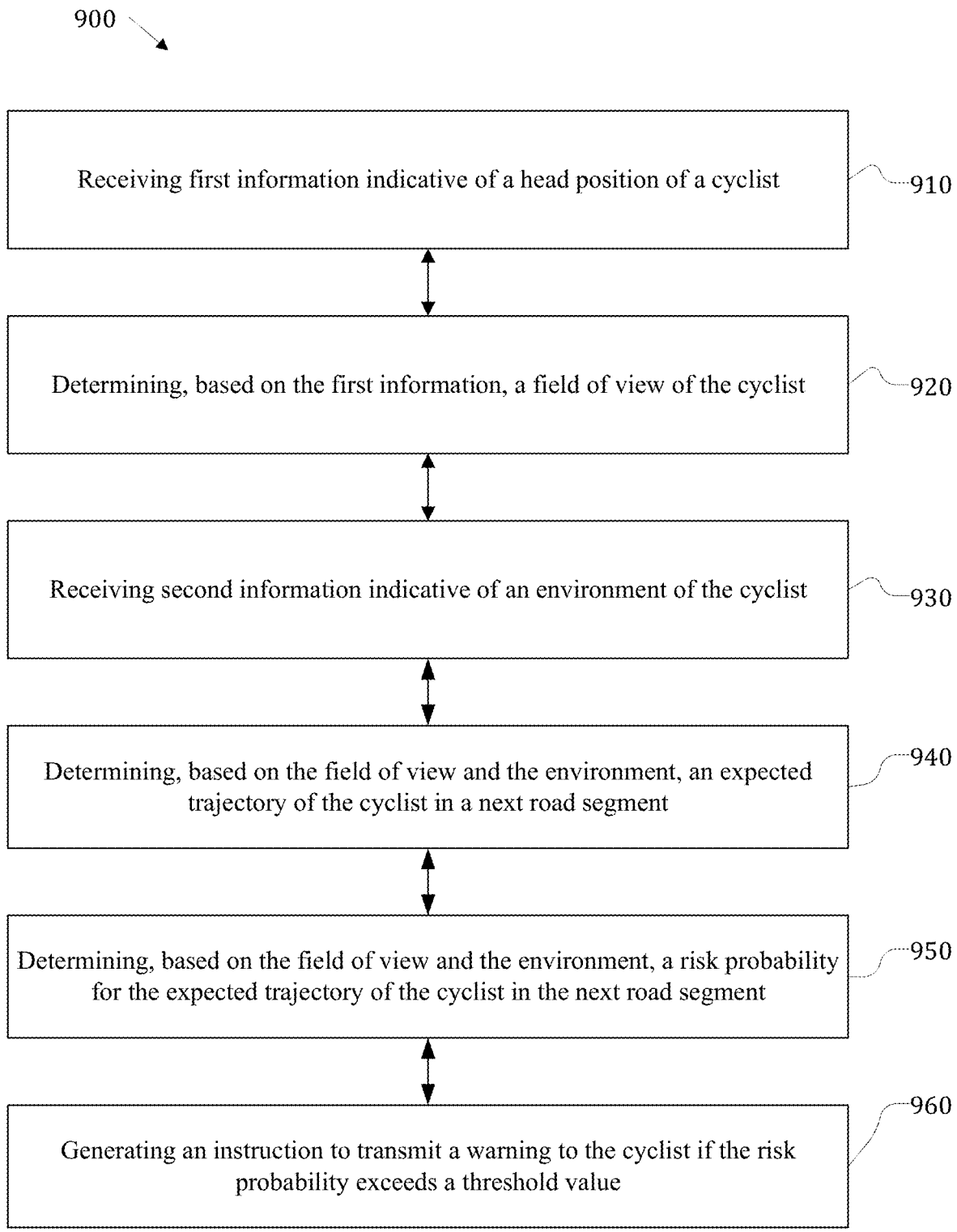
FIG. 9 depicts a schematic flow diagram of a method 900 for a safety system

FIG. 9 depicts a schematic flow diagram of a method 900 for a safety system for a cycle or pedestrian. Method 900 may implement any of the features described above with respect to, as examples, the active safety system of FIG. 1, active safety system 200 of FIG. 2, path prediction system 400 of FIG. 4, and/or risk comparison 700 of FIG. 7.

Method 900 includes, in 910, receiving first information indicative of a head position of a cyclist. Method 900 also includes, in 920, determining, based on the first information, a field of view of the cyclist. Method 900 also includes, in 930, receiving second information indicative of an environment of the cyclist. Method 900 also includes, in 940, determining, based on the field of view and the environment, an expected trajectory of the cyclist in a next road segment. Method 900 also includes, in 950, determining, based on the field of view and the environment, a risk probability for the expected trajectory of the cyclist in the next road segment. Method 900 also includes, in 960, generating an instruction to transmit a warning to the cyclist if the risk probability exceeds a threshold value.

Example 1 is an apparatus that includes a processor configured to receive first information indicative of a head position of a cyclist. The processor is also configured to determine, based on the first information, a field of view of the cyclist. The processor is also configured to receive second information indicative of an environment of the cyclist. The processor is also configured to determine, based on the field of view and the environment, an expected trajectory of the cyclist in a next road segment. The processor is also configured to determine, based on the field of view and the environment, a risk probability for the expected trajectory of the cyclist in the next road segment. The processor is also configured to generate an instruction to transmit a warning to the cyclist if the risk probability exceeds a threshold value.

Example 2 is the apparatus of Example 1, wherein the processor is further configured to determine the expected trajectory of the cyclist based on a duration of time the field of view is along a possible trajectory of the cyclist.

Example 3 is the apparatus of either of Examples 1 or 2, wherein the processor is further configured to determine the expected trajectory of the cyclist based on a posture of the cyclist indicating a possible trajectory of the cyclist.

Example 4 is the apparatus of Example 3, wherein the posture includes a head rotation of the cyclist toward a possible trajectory of the cyclist.

Example 5 is the apparatus of Example 3, wherein the posture includes an arm signal of the cyclist indicating a possible trajectory of the cyclist.

Example 6 is the apparatus of any one of Examples 1 to 5, wherein the processor is further configured to determine the expected trajectory of the cyclist based on received map information associated with a geographic location of the cyclist and/or a possible trajectory of the cyclist.

Example 7 is the apparatus of Example 6, wherein the processor is further configured to correlate the map information with the first information to estimate a focus probability that the cyclist is focused on the expected trajectory.

Example 8 is the apparatus of any one of Examples 1 to 7, wherein the processor is further configured to determine the expected trajectory of the cyclist based on information indicative of at least one of a direction of travel of the cyclist, a speed of the cyclist, and/or an acceleration of the cyclist.

Example 9 is the apparatus of any one of Examples 1 to 8 further including a receiver configured to wirelessly receive the first information and/or the second information.

Example 10 is the apparatus of any one of Examples 1 to 9, wherein the receiver is configured to wirelessly receive the first information and/or the second information using at least one of a V2X protocol, a WiFi protocol, and/or a Bluetooth protocol.

Example 11 is the apparatus of any one of Examples 1 to 10, further including a transmitter configured to wirelessly transmit the warning.

Example 12 is the apparatus of any one of Examples 1 to 11, wherein the processor is further configured to determine a plurality of possible trajectories for the cyclist and, for each possible trajectory of the plurality of possible trajectories, determine a path score and/or probability associated with the possible trajectory, and determine the next road segment and the expected trajectory based on the path scores and/or probabilities.

Example 13 is the apparatus of Example 12, wherein the processor is further configured to determine, for each possible trajectory of the plurality of possible trajectories, a risk score associated with the possible trajectory, wherein the risk score is based on the field of view of the cyclist.

Example 14 is the apparatus of Example 13, wherein the risk score is based on a safety model associated with the environment, wherein the safety model includes an unstructured safety model or a structured safety model.

Example 15 is the apparatus of Example 14, wherein the risk score is based on at least one of a number of objects in the environment, a distance of the cyclist from the objects, a speed of the objects, a trajectory of the objects, an acceleration of the objects, the expected trajectory of the cyclist, a speed of the cyclist, an acceleration of the cyclist, and/or a road geometry of the next road segment.

Example 16 is the apparatus of any one of Examples 1 to 15, wherein the risk probability is further based on a learning model associated with the cyclist, wherein the learning model is based on comparisons of the expected trajectory to an actual movement of the cyclist over a plurality of road segments.

Example 17 is the apparatus of Example 16, wherein the learning model includes at least one of a data-based learning model and/or a formula-based learning model.

Example 18 is the apparatus of Examples 16 or 17, wherein the processor is configured to receive the learning model from a cloud-based server or to transmit the comparisons to the cloud-based server.

Example 19 is the apparatus of any one of Examples 1 to 18, wherein the processor is further configured to determine an awareness score of the cyclist based on a focus point of the cyclist, wherein the focus point is based on at least one of the field of view of the cyclist, a head position of the cyclist, and/or an eye position of the cyclist.

Example 20 is the apparatus of Example 19, wherein the awareness score includes an expected response time of the cyclist, wherein the expected response time is based on a correlation of the focus point with the expected trajectory.

Example 21 is the apparatus of any one of Examples 1 to 20, wherein the risk probability is associated with a detected object within the expected trajectory.

Example 22 is the apparatus of any one of Examples 1 to 21, wherein the first information includes a camera image associated with a head position of the cyclist.

Example 23 is the apparatus of Example 22, wherein the processor is configured to receive the camera image from a forward-facing camera aligned with the head position of the cyclist.

Example 24 is the apparatus of either Example 22 or 23, wherein the processor is configured to receive the camera image from a cyclist-facing camera that faces the cyclist.

Example 25 is the apparatus of any one of Examples 1 to 24, wherein the second information includes sensor information received from a sensor of the cyclist, wherein the sensor includes at least one of a back-facing sensor configured to sense an area behind the cyclist, a front-facing sensor configured to sense an area in front of the cyclist, a body sensor configured to sense a pose, position, and/or a touch location of the cyclist, and/or a side-facing sensor configured to sense an area beside the cyclist.

Example 26 is the apparatus of Example 25, wherein the sensor includes at least one of a camera, a light detection and ranging sensor, a radar sensor, a positioning sensor, a touch sensor, an accelerometer, a magnetometer, and/or a gyroscope.

Example 27 is the apparatus of any one of Examples 1 to 26, wherein the warning includes at least one of a visual indication, an audible indication, and/or a haptic feedback configured to alert the cyclist of the risk probability.

Example 28 is the apparatus of any one of Examples 1 to 27, wherein the warning includes a movement instruction configured to respond to the risk probability.

Example 29 is the apparatus of Example 28, wherein the movement instruction includes an instruction to slow a speed of the cyclist in the next road segment.

Example 30 is the apparatus of Example 29, wherein the instruction is configured to disable a motive force associated with the cyclist.

Example 31 is the apparatus of either Example 29 or 30, wherein the instruction is configured to apply a brake associated with the cyclist.

Example 32 is the apparatus of any one of Examples 28 to 31, wherein the movement instruction includes an instruction to turn a steering mechanism associated with the cyclist.

Example 33 is the apparatus of any one of Examples 28 to 32, wherein the movement instruction depends on the risk probability and a control loss factor associated with the environment.

Example 34 is the apparatus of Example 33, wherein the control loss factor depends on a measured deceleration of the cyclist in response to the movement instruction.

Example 35 is the apparatus of either Example 33 or 34, wherein the control loss factor depends on a posture of the cyclist.

Example 36 is the apparatus of any one of Examples 33 or 35, wherein the control loss factor depends on a road condition of the next road segment.

Example 37 is the apparatus of Example 36, wherein the road condition includes at least one of a road damage to the next road segment, a wetness level of the next road segment, and/or a geometry of the next road segment.

Example 38 is the apparatus of any one of Examples 1 to 37, wherein the cyclist includes a pedestrian operating a bicycle.

Example 39 is the apparatus of any one of Example 38, wherein the bicycle is an electric bicycle or a motorized bicycle.

Example 40 is an apparatus that includes a processor configured to receive first information indicative of a head position of a pedestrian. The processor is also configured to receive second information indicative of an environment of the pedestrian. The processor is also configured to determine, based on the first information, a field of view of the pedestrian. The processor is also configured to determine, based on the field of view and the environment, an expected trajectory of the pedestrian in a next road segment. The processor is also configured to determine, based on the field of view and the environment, a risk probability for the expected trajectory of the pedestrian in the next road segment. The processor is also configured to generate an instruction to transmit a warning to the pedestrian if the risk probability exceeds a threshold value.

Example 41 is the apparatus of Example 40, wherein the processor is further configured to determine the expected trajectory of the pedestrian based on a duration of time the field of view is along a possible trajectory of the pedestrian.

Example 42 is the apparatus of either of Examples 40 or 41, wherein the processor is further configured to determine the expected trajectory of the pedestrian based on a posture of the pedestrian indicating a possible trajectory of the pedestrian.

Example 43 is the apparatus of Example 42, wherein the posture includes a head rotation of the pedestrian toward a possible trajectory of the pedestrian.

Example 44 is the apparatus of Example 42, wherein the posture includes an arm signal of the pedestrian indicating a possible trajectory of the pedestrian.

Example 45 is the apparatus of any one of Examples 40 to 44, wherein the processor is further configured to determine the expected trajectory of the pedestrian based on received map information associated with a geographic location of the pedestrian and/or a possible trajectory of the pedestrian.

Example 46 is the apparatus of Example 45, wherein the processor is further configured to correlate the map information with the first information to estimate a focus probability that the pedestrian is focused on the expected trajectory.

Example 47 is the apparatus of any one of Examples 40 to 46, wherein the processor is further configured to determine the expected trajectory of the pedestrian based on information indicative of at least one of a direction of travel of the pedestrian, a speed of the pedestrian, and/or an acceleration of the pedestrian.

Example 48 is the apparatus of any one of Examples 40 to 47 further including a receiver configured to wirelessly receive the first information and/or the second information.

Example 49 is the apparatus of any one of Examples 40 to 48, wherein the receiver is configured to wirelessly receive the first information and/or the second information using at least one of a V2X protocol, a WiFi protocol, and/or a Bluetooth protocol.

Example 50 is the apparatus of any one of Examples 40 to 49, further including a transmitter configured to wirelessly transmit the warning.

Example 51 is the apparatus of any one of Examples 40 to 50, wherein the processor is further configured to determine a plurality of possible trajectories for the pedestrian and, for each possible trajectory of the plurality of possible trajectories, determine a path score and/or probability associated with the possible trajectory, and determine the next road segment and the expected trajectory based on the path scores and/or probabilities.

Example 52 is the apparatus of Example 51, wherein the processor is further configured to determine, for each possible trajectory of the plurality of possible trajectories, a risk score associated with the possible trajectory, wherein the risk score is based on the field of view of the pedestrian.

Example 53 is the apparatus of Example 52, wherein the risk score is based on a safety model associated with the environment, wherein the safety model includes an unstructured safety model or a structured safety model.

Example 54 is the apparatus of Example 53, wherein the risk score is based on at least one of a number of objects in the environment, a distance of the pedestrian from the objects, a speed of the objects, a trajectory of the objects, an acceleration of the objects, the expected trajectory of the pedestrian, a speed of the pedestrian, an acceleration of the pedestrian, and/or a road geometry of the next road segment.

Example 55 is the apparatus of any one of Examples 40 to 54, wherein the risk probability is further based on a learning model associated with the pedestrian, wherein the learning model is based on comparisons of the expected trajectory to an actual movement of the pedestrian over a plurality of road segments.

Example 56 is the apparatus of Example 55, wherein the learning model includes at least one of a data-based learning model and/or a formula-based learning model.

Example 57 is the apparatus of Examples 55 or 56, wherein the processor is configured to receive the learning model from a cloud-based server or to transmit the comparisons to the cloud-based server.

Example 58 is the apparatus of any one of Examples 40 to 57, wherein the processor is further configured to determine an awareness score of the pedestrian based on a focus point of the pedestrian, wherein the focus point is based on at least one of the field of view of the pedestrian, a head position of the pedestrian, and/or an eye position of the pedestrian.

Example 59 is the apparatus of Example 58, wherein the awareness score includes an expected response time of the pedestrian, wherein the expected response time is based on a correlation of the focus point with the expected trajectory.

Example 60 is the apparatus of any one of Examples 40 to 59, wherein the risk probability is associated with a detected object within the expected trajectory.

Example 61 is the apparatus of any one of Examples 40 to 60, wherein the first information includes a camera image associated with a head position of the pedestrian.

Example 62 is the apparatus of Example 61, wherein the processor is configured to receive the camera image from a forward-facing camera aligned with the head position of the pedestrian.

Example 63 is the apparatus of either Example 61 or 62, wherein the processor is configured to receive the camera image from a pedestrian-facing camera that faces the pedestrian.

Example 64 is the apparatus of any one of Examples 40 to 63, wherein the second information includes sensor information received from a sensor of the pedestrian, wherein the sensor includes at least one of a back-facing sensor configured to sense an area behind the pedestrian, a front-facing sensor configured to sense an area in front of the pedestrian, a body sensor configured to sense a pose, position, and/or a touch location of the pedestrian, and/or a side-facing sensor configured to sense an area beside the pedestrian.

Example 65 is the apparatus of Example 64, wherein the sensor includes at least one of a camera, a light detection and ranging sensor, a radar sensor, a positioning sensor, a touch sensor, an accelerometer, a magnetometer, and/or a gyroscope.

Example 66 is the apparatus of any one of Examples 40 to 65, wherein the warning includes at least one of a visual indication, an audible indication, and/or a haptic feedback configured to alert the pedestrian of the risk probability.

Example 67 is a device for monitoring and reacting to the safety of a cyclist. The device includes a receiving means for receiving first information indicative of a head position of a cyclist. The device also includes a determining means for determining, based on the first information, a field of view of the cyclist. The device also includes a receiving means for receiving second information indicative of an environment of the cyclist. The device also includes a determining means for determining, based on the field of view and the environment, an expected trajectory of the cyclist in a next road segment. The device also includes a determining means for determining, based on the field of view and the environment, a risk probability for the expected trajectory of the cyclist in the next road segment. The device also includes a generating means for generating an instruction for transmitting a warning to the cyclist if the risk probability exceeds a threshold value.

Example 68 is the device of Example 67, wherein the device includes a determining means for determining the expected trajectory of the cyclist based on a duration of time the field of view is along a possible trajectory of the cyclist.

Example 69 is the device of either of Examples 67 or 68, wherein the device includes a determining means for determining the expected trajectory of the cyclist based on a posture of the cyclist indicating a possible trajectory of the cyclist.

Example 70 is the device of Example 69, wherein the posture includes a head rotation of the cyclist toward a possible trajectory of the cyclist.

Example 71 is the device of Example 69, wherein the posture includes an arm signal of the cyclist indicating a possible trajectory of the cyclist.

Example 72 is the device of any one of Examples 67 to 71, wherein the device includes a determining means for determining the expected trajectory of the cyclist based on received map information associated with a geographic location of the cyclist and/or a possible trajectory of the cyclist.

Example 73 is the device of Example 72, wherein the device includes a correlating means for correlating the map information with the first information to estimate a focus probability that the cyclist is focused on the expected trajectory.

Example 74 is the device of any one of Examples 67 to 73, wherein the device includes a determining means for determining the expected trajectory of the cyclist based on information indicative of at least one of a direction of travel of the cyclist, a speed of the cyclist, and/or an acceleration of the cyclist.

Example 75 is the device of any one of Examples 67 to 74, wherein the device includes a receiving means for wirelessly receiving the first information and/or the second information.

Example 76 is the device of any one of Examples 67 to 75, wherein the receiving means is configured to wirelessly receive the first information and/or the second information using at least one of a V2X protocol, a WiFi protocol, and/or a Bluetooth protocol.

Example 77 is the device of any one of Examples 67 to 76, wherein the device includes a transmitting means for wirelessly transmitting the warning.

Example 78 is the device of any one of Examples 67 to 77, wherein the device includes a determining means for determining a plurality of possible trajectories for the cyclist and, for each possible trajectory of the plurality of possible trajectories, determining a path score and/or probability associated with the possible trajectory, and determining the next road segment and the expected trajectory based on the path scores and/or probabilities.

Example 79 is the device of Example 78, wherein the device includes a determining means for determining, for each possible trajectory of the plurality of possible trajectories, a risk score associated with the possible trajectory, wherein the risk score is based on the field of view of the cyclist.

Example 80 is the device of Example 79, wherein the risk score is based on a safety model associated with the environment, wherein the safety model includes an unstructured safety model or a structured safety model.

Example 81 is the device of Example 80, wherein the risk score is based on at least one of a number of objects in the environment, a distance of the cyclist from the objects, a speed of the objects, a trajectory of the objects, an acceleration of the objects, the expected trajectory of the cyclist, a speed of the cyclist, an acceleration of the cyclist, and/or a road geometry of the next road segment.

Example 82 is the device of any one of Examples 67 to 81, wherein the risk probability is further based on a learning model associated with the cyclist, wherein the learning model is based on comparisons of the expected trajectory to an actual movement of the cyclist over a plurality of road segments.

Example 83 is the device of Example 82, wherein the learning model includes at least one of a data-based learning model and/or a formula-based learning model.

Example 84 is the device of Examples 82 or 83, wherein the device includes a receiving means for receiving the learning model from a cloud-based server or a transmitting means for transmitting the comparisons to the cloud-based server.

Example 85 is the device of any one of Examples 67 to 84, wherein the device includes a determining means for determining an awareness score of the cyclist based on a focus point of the cyclist, wherein the focus point is based on at least one of the field of view of the cyclist, a head position of the cyclist, and/or an eye position of the cyclist.

Example 86 is the device of Example 85, wherein the awareness score includes an expected response time of the cyclist, wherein the expected response time is based on a correlation of the focus point with the expected trajectory.

Example 87 is the device of any one of Examples 67 to 86, wherein the risk probability is associated with a detected object within the expected trajectory.

Example 88 is the device of any one of Examples 67 to 87, wherein the first information includes a camera image associated with a head position of the cyclist.

Example 89 is the device of Example 88, wherein the device includes a receiving means for receiving the camera image from a forward-facing camera aligned with the head position of the cyclist.

Example 90 is the device of either Example 88 or 89, wherein the receiving means receives the camera image from a cyclist-facing camera that faces the cyclist.

Example 91 is the device of any one of Examples 67 to 90, wherein the second information includes sensor information received from a sensing means, wherein the sensing means includes at least one of a means for sensing an area behind the cyclist, a means for sensing an area in front of the cyclist, a means for sensing a pose, position, and/or a touch location of the cyclist, and/or a means for sensing an area beside the cyclist.

Example 92 is the device of Example 91, wherein the sensor includes at least one of a camera, a light detection and ranging sensor, a radar sensor, a positioning sensor, a touch sensor, an accelerometer, a magnetometer, and/or a gyroscope.

Example 93 is the device of any one of Examples 67 to 92, wherein the warning includes at least one of a visual indication, an audible indication, and/or a haptic feedback configured to alert the cyclist of the risk probability.

Example 94 is the device of any one of Examples 67 to 93, wherein the warning includes a movement instruction configured to respond to the risk probability.

Example 95 is the device of Example 94, wherein the movement instruction includes an instruction to slow a speed of the cyclist in the next road segment.

Example 96 is the device of Example 95, wherein the instruction is configured to disable a motive force associated with the cyclist.

Example 97 is the device of either Example 95 or 96, wherein the instruction is configured to apply a brake associated with the cyclist.

Example 98 is the device of any one of Examples 94 to 97, wherein the movement instruction includes an instruction to turn a steering mechanism associated with the cyclist.

Example 99 is the device of any one of Examples 94 to 98, wherein the movement instruction depends on the risk probability and a control loss factor associated with the environment.

Example 100 is the device of Example 99, wherein the control loss factor depends on a measured deceleration of the cyclist in response to the movement instruction.

Example 101 is the device of either Example 99 or 100, wherein the control loss factor depends on a posture of the cyclist.

Example 102 is the device of any one of Examples 99 or 101, wherein the control loss factor depends on a road condition of the next road segment.

Example 103 is the device of Example 102, wherein the road condition includes at least one of a road damage to the next road segment, a wetness level of the next road segment, and/or a geometry of the next road segment.

Example 104 is the device of any one of Examples 67 to 103, wherein the cyclist includes a pedestrian operating a bicycle.

Example 105 is the device of any one of Example 104, wherein the bicycle is an electric bicycle or a motorized bicycle.

Example 106 is a device that includes a means for receiving first information indicative of a head position of a pedestrian. The device also includes a means for receiving second information indicative of an environment of the pedestrian. The device also includes a means for determining, based on the first information, a field of view of the pedestrian. The device also includes a means for determining, based on the field of view and the environment, an expected trajectory of the pedestrian in a next road segment.

The device also includes a means for determining, based on the field of view and the environment, a risk probability for the expected trajectory of the pedestrian in the next road segment. The device also includes a means for generating an instruction for transmitting a warning to the pedestrian if the risk probability exceeds a threshold value.

Example 107 is the device of Example 106, wherein the device also includes a means for determining the expected trajectory of the pedestrian based on a duration of time the field of view is along a possible trajectory of the pedestrian.

Example 108 is the device of either of Examples 106 or 107, wherein the device also includes a means for determining the expected trajectory of the pedestrian based on a posture of the pedestrian indicating a possible trajectory of the pedestrian.

Example 109 is the device of Example 108, wherein the posture includes a head rotation of the pedestrian toward a possible trajectory of the pedestrian.

Example 110 is the device of Example 108, wherein the posture includes an arm signal of the pedestrian indicating a possible trajectory of the pedestrian.

Example 111 is the device of any one of Examples 106 to 110, wherein the device also includes a means for determining the expected trajectory of the pedestrian based on received map information associated with a geographic location of the pedestrian and/or a possible trajectory of the pedestrian.

Example 112 is the device of Example 111, wherein the device also includes a means for correlating the map information with the first information to estimate a focus probability that the pedestrian is focused on the expected trajectory.

Example 113 is the device of any one of Examples 106 to 112, wherein the device also includes a means for determining the expected trajectory of the pedestrian based on information indicative of at least one of a direction of travel of the pedestrian, a speed of the pedestrian, and/or an acceleration of the pedestrian.

Example 114 is the device of any one of Examples 106 to 113, wherein the device also includes a means for wirelessly receiving the first information and/or the second information.

Example 115 is the device of any one of Examples 106 to 114, wherein the device also includes a means for wirelessly receiving the first information and/or the second information using at least one of a V2X protocol, a WiFi protocol, and/or a Bluetooth protocol.

Example 116 is the device of any one of Examples 106 to 115, wherein the device also includes a means for wirelessly transmitting the warning.

Example 117 is the device of any one of Examples 106 to 116, wherein the device also includes a means for determining a plurality of possible trajectories for the pedestrian and, for each possible trajectory of the plurality of possible trajectories, determining a path score and/or probability associated with the possible trajectory, and determining the next road segment and the expected trajectory based on the path scores and/or probabilities.

Example 118 is the device of Example 117, wherein the device also includes a means for determining, for each possible trajectory of the plurality of possible trajectories, a risk score associated with the possible trajectory, wherein the risk score is based on the field of view of the pedestrian.

Example 119 is the device of Example 118, wherein the risk score is based on a safety model associated with the environment, wherein the safety model includes an unstructured safety model or a structured safety model.

Example 120 is the device of Example 119, wherein the risk score is based on at least one of a number of objects in the environment, a distance of the pedestrian from the objects, a speed of the objects, a trajectory of the objects, an acceleration of the objects, the expected trajectory of the pedestrian, a speed of the pedestrian, an acceleration of the pedestrian, and/or a road geometry of the next road segment.

Example 121 is the device of any one of Examples 106 to 120, wherein the risk probability is further based on a learning model associated with the pedestrian, wherein the learning model is based on comparisons of the expected trajectory to an actual movement of the pedestrian over a plurality of road segments.

Example 122 is the device of Example 121, wherein the learning model includes at least one of a data-based learning model and/or a formula-based learning model.

Example 123 is the device of Examples 121 or 122, wherein the device also includes a means for receiving the learning model from a cloud-based server or a means for transmitting the comparisons to the cloud-based server.

Example 124 is the device of any one of Examples 106 to 123, wherein the device also includes a means for determining an awareness score of the pedestrian based on a focus point of the pedestrian, wherein the focus point is based on at least one of the field of view of the pedestrian, a head position of the pedestrian, and/or an eye position of the pedestrian.

Example 125 is the device of Example 124, wherein the awareness score includes an expected response time of the pedestrian, wherein the expected response time is based on a correlation of the focus point with the expected trajectory.

Example 126 is the device of any one of Examples 106 to 125, wherein the risk probability is associated with a detected object within the expected trajectory.

Example 127 is the device of any one of Examples 106 to 126, wherein the first information includes a camera image associated with a head position of the pedestrian.

Example 128 is the device of Example 127, wherein the device also includes a means for receiving the camera image from a forward-facing camera aligned with the head position of the pedestrian.

Example 129 is the device of either Example 127 or 128, wherein the device also includes a means for receiving the camera image from a pedestrian-facing camera that faces the pedestrian.

Example 130 is the device of any one of Examples 106 to 129, wherein the second information includes sensor information received from a sensing means, wherein the sensing means includes at least one of a means for sensing an area behind the pedestrian, a means for sensing an area in front of the pedestrian, a means for sensing a pose, position, and/or a touch location of the pedestrian, and/or a means for sensing an area beside the pedestrian.

Example 131 is the device of Example 130, wherein the sensing means includes at least one of a camera, a light detection and ranging sensor, a radar sensor, a positioning sensor, a touch sensor, an accelerometer, a magnetometer, and/or a gyroscope.

Example 132 is the device of any one of Examples 106 to 131, wherein the warning includes at least one of a visual indication, an audible indication, and/or a haptic feedback configured to alert the pedestrian of the risk probability.

Example 133 is a method for monitoring and reacting to the safety of a cyclist. The method includes receiving first information indicative of a head position of a cyclist. The method also includes determining, based on the received first information, a field of view of the cyclist. The method also includes receiving second information indicative of an environment of the cyclist. The method also includes determining, based on the field of view and the environment, an expected trajectory of the cyclist in a next road segment. The method also includes determining, based on the field of view and the environment, a risk probability for the expected trajectory of the cyclist in the next road segment. The method also includes generating an instruction for transmitting a warning to the cyclist if the risk probability exceeds a threshold value.

Example 134 is the method of Example 133, wherein the method includes determining the expected trajectory of the cyclist based on a duration of time the field of view is along a possible trajectory of the cyclist.

Example 135 is the method of either of Examples 133 or 134, wherein the method includes determining the expected trajectory of the cyclist based on a posture of the cyclist indicating a possible trajectory of the cyclist.

Example 136 is the method of Example 135, wherein the posture includes a head rotation of the cyclist toward a possible trajectory of the cyclist.

Example 137 is the method of Example 135, wherein the posture includes an arm signal of the cyclist indicating a possible trajectory of the cyclist.

Example 138 is the method of any one of Examples 133 to 137, wherein the method includes determining the expected trajectory of the cyclist based on received map information associated with a geographic location of the cyclist and/or a possible trajectory of the cyclist.

Example 139 is the method of Example 138, wherein the method includes correlating the map information with the first information to estimate a focus probability that the cyclist is focused on the expected trajectory.

Example 140 is the method of any one of Examples 133 to 139, wherein the method includes determining the expected trajectory of the cyclist based on information indicative of at least one of a direction of travel of the cyclist, a speed of the cyclist, and/or an acceleration of the cyclist.

Example 141 is the method of any one of Examples 133 to 140, wherein the method includes receiving the first information and/or the second information.

Example 142 is the method of any one of Examples 133 to 141, wherein the receiving includes wirelessly receiving the first information and/or the second information using at least one of a V2X protocol, a WiFi protocol, and/or a Bluetooth protocol.

Example 143 is the method of any one of Examples 133 to 142, wherein the method includes wirelessly transmitting the warning.

Example 144 is the method of any one of Examples 133 to 143, wherein the method includes determining a plurality of possible trajectories for the cyclist and, for each possible trajectory of the plurality of possible trajectories, determining a path score and/or probability associated with the possible trajectory, and determining the next road segment and the expected trajectory based on the path scores and/or probabilities.

Example 145 is the method of Example 144, wherein the method includes determining, for each possible trajectory of the plurality of possible trajectories, a risk score associated with the possible trajectory, wherein the risk score is based on the field of view of the cyclist.

Example 146 is the method of Example 145, wherein the risk score is based on a safety model associated with the environment, wherein the safety model includes an unstructured safety model or a structured safety model.

Example 147 is the method of Example 146, wherein the risk score is based on at least one of a number of objects in the environment, a distance of the cyclist from the objects, a speed of the objects, a trajectory of the objects, an acceleration of the objects, the expected trajectory of the cyclist, a speed of the cyclist, an acceleration of the cyclist, and/or a road geometry of the next road segment.

Example 148 is the method of any one of Examples 133 to 147, wherein the risk probability is further based on a learning model associated with the cyclist, wherein the learning model is based on comparisons of the expected trajectory to an actual movement of the cyclist over a plurality of road segments.

Example 149 is the method of Example 148, wherein the learning model includes at least one of a data-based learning model and/or a formula-based learning model.

Example 150 is the method of Examples 148 or 149, wherein the method includes receiving the learning model from a cloud-based server or transmitting the comparisons to the cloud-based server.

Example 151 is the method of any one of Examples 133 to 150, wherein the method includes determining an awareness score of the cyclist based on a focus point of the cyclist, wherein the focus point is based on at least one of the field of view of the cyclist, a head position of the cyclist, and/or an eye position of the cyclist.

Example 152 is the method of Example 151, wherein the awareness score includes an expected response time of the cyclist, wherein the expected response time is based on a correlation of the focus point with the expected trajectory.

Example 153 is the method of any one of Examples 133 to 152, wherein the risk probability is associated with a detected object within the expected trajectory.

Example 154 is the method of any one of Examples 133 to 153, wherein the first information includes a camera image associated with a head position of the cyclist.

Example 155 is the method of Example 154, wherein the method includes receiving the camera image from a forward-facing camera aligned with the head position of the cyclist.

Example 156 is the method of either Example 154 or 155, wherein receiving the camera image includes receiving the camera image from a cyclist-facing camera that faces the cyclist.

Example 157 is the method of any one of Examples 133 to 156, wherein receiving the second information includes receiving sensor information from a sensor of the cyclist, wherein the sensor information includes at least one of a back-facing sensor information indicative of an area behind the cyclist, a front-facing sensor information indicative of an area in front of the cyclist, a body sensor information indicative of a pose, position, and/or a touch location of the cyclist, and/or a side-facing sensor information indicative of an area beside the cyclist.

Example 158 is the method of Example 157, wherein the sensor includes at least one of a camera, a light detection and ranging sensor, a radar sensor, a positioning sensor, a touch sensor, an accelerometer, a magnetometer, and/or a gyroscope.

Example 159 is the method of any one of Examples 133 to 158, wherein the warning includes at least one of a visual indication, an audible indication, and/or a haptic feedback configured to alert the cyclist of the risk probability.

Example 160 is the method of any one of Examples 133 to 159, wherein the warning includes a movement instruction configured to respond to the risk probability.

Example 161 is the method of Example 160, wherein the movement instruction includes an instruction to slow a speed of the cyclist in the next road segment.

Example 162 is the method of Example 161, wherein the instruction is configured to disable a motive force associated with the cyclist.

Example 163 is the method of either Example 161 or 162, wherein the instruction is configured to apply a brake associated with the cyclist.

Example 164 is the method of any one of Examples 160 to 163, wherein the movement instruction includes an instruction to turn a steering mechanism associated with the cyclist.

Example 165 is the method of any one of Examples 160 to 164, wherein the movement instruction depends on the risk probability and a control loss factor associated with the environment.

Example 166 is the method of Example 165, wherein the control loss factor depends on a measured deceleration of the cyclist in response to the movement instruction.

Example 167 is the method of either Example 165 or 166, wherein the control loss factor depends on a posture of the cyclist.

Example 168 is the method of any one of Examples 165 or 167, wherein the control loss factor depends on a road condition of the next road segment.

Example 169 is the method of Example 168, wherein the road condition includes at least one of a road damage to the next road segment, a wetness level of the next road segment, and/or a geometry of the next road segment.

Example 170 is the method of any one of Examples 133 to 169, wherein the cyclist includes a pedestrian operating a bicycle.

Example 171 is the method of any one of Example 170, wherein the bicycle is an electric bicycle or a motorized bicycle.

Example 172 is a method for monitoring and reacting to the safety of a pedestrian that includes receiving first information indicative of a head position of a pedestrian. The method also includes receiving second information indicative of an environment of the pedestrian. The method also includes determining, based on the first information, a field of view of the pedestrian. The method also includes determining, based on the field of view and the environment, an expected trajectory of the pedestrian in a next road segment. The method also includes determining, based on the field of view and the environment, a risk probability for the expected trajectory of the pedestrian in the next road segment. The method also includes generating an instruction for transmitting a warning to the pedestrian if the risk probability exceeds a threshold value.

Example 173 is the method of Example 172, wherein the method also includes determining the expected trajectory of the pedestrian based on a duration of time the field of view is along a possible trajectory of the pedestrian.

Example 174 is the method of either of Examples 172 or 173, wherein the method also includes determining the expected trajectory of the pedestrian based on a posture of the pedestrian indicating a possible trajectory of the pedestrian.

Example 175 is the method of Example 174, wherein the posture includes a head rotation of the pedestrian toward a possible trajectory of the pedestrian.

Example 176 is the method of Example 174, wherein the posture includes an arm signal of the pedestrian indicating a possible trajectory of the pedestrian.

Example 177 is the method of any one of Examples 172 to 176, wherein the method also includes determining the expected trajectory of the pedestrian based on received map information associated with a geographic location of the pedestrian and/or a possible trajectory of the pedestrian.

Example 178 is the method of Example 177, wherein the method also includes correlating the map information with the first information to estimate a focus probability that the pedestrian is focused on the expected trajectory.

Example 179 is the method of any one of Examples 172 to 178, wherein the method also includes determining the expected trajectory of the pedestrian based on information indicative of at least one of a direction of travel of the pedestrian, a speed of the pedestrian, and/or an acceleration of the pedestrian.

Example 180 is the method of any one of Examples 172 to 179, wherein the method also includes wirelessly receiving the first information and/or the second information.

Example 181 is the method of any one of Examples 172 to 180, wherein the method also includes wirelessly receiving the first information and/or the second information using at least one of a V2X protocol, a WiFi protocol, and/or a Bluetooth protocol.

Example 182 is the method of any one of Examples 172 to 181, wherein the method also includes wirelessly transmitting the warning.

Example 183 is the method of any one of Examples 172 to 182, wherein the method also includes determining a plurality of possible trajectories for the pedestrian and, for each possible trajectory of the plurality of possible trajectories, determining a path score and/or probability associated with the possible trajectory, and determining the next road segment and the expected trajectory based on the path scores and/or probabilities.

Example 184 is the method of Example 183, wherein the method also includes determining, for each possible trajectory of the plurality of possible trajectories, a risk score associated with the possible trajectory, wherein the risk score is based on the field of view of the pedestrian.

Example 185 is the method of Example 184, wherein the risk score is based on a safety model associated with the environment, wherein the safety model includes an unstructured safety model or a structured safety model.

Example 186 is the method of Example 185, wherein the risk score is based on at least one of a number of objects in the environment, a distance of the pedestrian from the objects, a speed of the objects, a trajectory of the objects, an acceleration of the objects, the expected trajectory of the pedestrian, a speed of the pedestrian, an acceleration of the pedestrian, and/or a road geometry of the next road segment.

Example 187 is the method of any one of Examples 172 to 186, wherein the risk probability is further based on a learning model associated with the pedestrian, wherein the learning model is based on comparisons of the expected trajectory to an actual movement of the pedestrian over a plurality of road segments.

Example 188 is the method of Example 187, wherein the learning model includes at least one of a data-based learning model and/or a formula-based learning model.

Example 189 is the method of Examples 187 or 188, wherein the method also includes receiving the learning model from a cloud-based server or transmitting the comparisons to the cloud-based server.

Example 190 is the method of any one of Examples 172 to 189, wherein the method also includes determining an awareness score of the pedestrian based on a focus point of the pedestrian, wherein the focus point is based on at least one of the field of view of the pedestrian, a head position of the pedestrian, and/or an eye position of the pedestrian.

Example 191 is the method of Example 190, wherein the awareness score includes an expected response time of the pedestrian, wherein the expected response time is based on a correlation of the focus point with the expected trajectory.

Example 192 is the method of any one of Examples 172 to 191, wherein the risk probability is associated with a detected object within the expected trajectory.

Example 193 is the method of any one of Examples 172 to 192, wherein the first information includes a camera image associated with a head position of the pedestrian.

Example 194 is the method of Example 193, wherein the method also includes receiving the camera image from a forward-facing camera aligned with the head position of the pedestrian.

Example 195 is the method of either Example 193 or 194, wherein the method also includes receiving the camera image from a pedestrian-facing camera that faces the pedestrian.

Example 196 is the method of any one of Examples 172 to 195, wherein the second information includes receiving sensor information from a sensor of the pedestrian, wherein the sensor information includes at least one of a back-facing sensor information indicative of an area behind the pedestrian, a front-facing sensor information indicative of an area in front of the pedestrian, a body sensor information indicative of a pose of the pedestrian, and/or a side-facing sensor information indicative of an area beside the pedestrian.

Example 197 is the method of Example 196, wherein the sensor includes at least one of a camera, a light detection and ranging sensor, a radar sensor, a positioning sensor, a touch sensor, an accelerometer, a magnetometer, and/or a gyroscope.

Example 198 is the method of any one of Examples 172 to 197, wherein the warning includes at least one of a visual indication, an audible indication, and/or a haptic feedback configured to alert the pedestrian of the risk probability.

Example 199 is a non-transitory computer readable medium, comprising instructions which, if executed, cause one or more processors to receive first information indicative of a head position of a cyclist. The instructions also cause the processor to determine, based on the first information, a field of view of the cyclist. The instructions also cause the processor to receive second information indicative of an environment of the cyclist. The instructions also cause the processor to determine, based on the field of view and the environment, an expected trajectory of the cyclist in a next road segment. The instructions also cause the processor to determine, based on the field of view and the environment, a risk probability for the expected trajectory of the cyclist in the next road segment. The instructions also cause the processor to generate an instruction to transmit a warning to the cyclist if the risk probability exceeds a threshold value.

Example 200 is the non-transitory computer readable medium of Example 199, wherein the instructions also cause the processor to determine the expected trajectory of the cyclist based on a duration of time the field of view is along a possible trajectory of the cyclist.

Example 201 is the non-transitory computer readable medium of either of Examples 199 or 200, wherein the instructions also cause the processor to determine the expected trajectory of the cyclist based on a posture of the cyclist indicating a possible trajectory of the cyclist.

Example 202 is the non-transitory computer readable medium of Example 201, wherein the posture includes a head rotation of the cyclist toward a possible trajectory of the cyclist.

Example 203 is the non-transitory computer readable medium of Example 201, wherein the posture includes an arm signal of the cyclist indicating a possible trajectory of the cyclist.

Example 204 is the non-transitory computer readable medium of any one of Examples 199 to 203, wherein the instructions also cause the processor to determine the expected trajectory of the cyclist based on received map information associated with a geographic location of the cyclist and/or a possible trajectory of the cyclist.

Example 205 is the non-transitory computer readable medium of Example 204, wherein the instructions also cause the processor to correlate the map information with the first information to estimate a focus probability that the cyclist is focused on the expected trajectory.

Example 206 is the non-transitory computer readable medium of any one of Examples 199 to 205, wherein the instructions also cause the processor to determine the expected trajectory of the cyclist based on information indicative of at least one of a direction of travel of the cyclist, a speed of the cyclist, and/or an acceleration of the cyclist.

Example 207 is the non-transitory computer readable medium of any one of Examples 199 to 206 further including a receiver coupled to the processor, wherein the instructions cause the receiver to wirelessly receive the first information and/or the second information.

Example 208 is the non-transitory computer readable medium of any one of Examples 199 to 207, wherein the instructions that cause the receiver to wirelessly receive the first information and/or the second information includes instructions that cause the receiver to wirelessly receive the first information and/or the second information using at least one of a V2X protocol, a WiFi protocol, and/or a Bluetooth protocol.

Example 209 is the non-transitory computer readable medium of any one of Examples 199 to 208, further including a transmitter coupled to the processor, wherein the instructions cause the transmitter to wirelessly transmit the warning.

Example 210 is the non-transitory computer readable medium of any one of Examples 199 to 209, wherein the instructions also cause the processor to determine a plurality of possible trajectories for the cyclist and, for each possible trajectory of the plurality of possible trajectories, determine a path score and/or probability associated with the possible trajectory, and determine the next road segment and the expected trajectory based on the path scores and/or probabilities.

Example 211 is the non-transitory computer readable medium of Example 210, wherein the instructions also cause the processor to determine, for each possible trajectory of the plurality of possible trajectories, a risk score associated with the possible trajectory, wherein the risk score is based on the field of view of the cyclist.

Example 212 is the non-transitory computer readable medium of Example 211, wherein the risk score is based on a safety model associated with the environment, wherein the safety model includes an unstructured safety model or a structured safety model.

Example 213 is the non-transitory computer readable medium of Example 212, wherein the risk score is based on at least one of a number of objects in the environment, a distance of the cyclist from the objects, a speed of the objects, a trajectory of the objects, an acceleration of the objects, the expected trajectory of the cyclist, a speed of the cyclist, an acceleration of the cyclist, and/or a road geometry of the next road segment.

Example 214 is the non-transitory computer readable medium of any one of Examples 199 to 213, wherein the risk probability is further based on a learning model associated with the cyclist, wherein the learning model is based on comparisons of the expected trajectory to an actual movement of the cyclist over a plurality of road segments.

Example 215 is the non-transitory computer readable medium of Example 214, wherein the learning model includes at least one of a data-based learning model and/or a formula-based learning model.

Example 216 is the non-transitory computer readable medium of Examples 214 or 215, wherein the instructions also cause the processor to receive the learning model from a cloud-based server or to transmit the comparisons to the cloud-based server.

Example 217 is the non-transitory computer readable medium of any one of Examples 199 to 216, wherein the instructions also cause the processor to determine an awareness score of the cyclist based on a focus point of the cyclist, wherein the focus point is based on at least one of the field of view of the cyclist, a head position of the cyclist, and/or an eye position of the cyclist.

Example 218 is the non-transitory computer readable medium of Example 217, wherein the awareness score includes an expected response time of the cyclist, wherein the expected response time is based on a correlation of the focus point with the expected trajectory.

Example 219 is the non-transitory computer readable medium of any one of Examples 199 to 218, wherein the risk probability is associated with a detected object within the expected trajectory.

Example 220 is the non-transitory computer readable medium of any one of Examples 199 to 219, wherein the first information includes a camera image associated with a head position of the cyclist.

Example 221 is the non-transitory computer readable medium of Example 220, wherein the instructions also cause the processor to receive the camera image from a forward-facing camera aligned with the head position of the cyclist.

Example 222 is the non-transitory computer readable medium of either Example 220 or 221, wherein the instructions also cause the processor to receive the camera image from a cyclist-facing camera that faces the cyclist.

Example 223 is the non-transitory computer readable medium of any one of Examples 199 to 222, wherein the second information includes sensor information received from a sensor of the cyclist, wherein the sensor includes at least one of a back-facing sensor configured to sense an area behind the cyclist, a front-facing sensor configured to sense an area in front of the cyclist, a body sensor configured to sense a pose, position, and/or a touch location of the cyclist, and/or a side-facing sensor configured to sense an area beside the cyclist.

Example 224 is the non-transitory computer readable medium of Example 223, wherein the sensor includes at least one of a camera, a light detection and ranging sensor, a radar sensor, a positioning sensor, a touch sensor, an accelerometer, a magnetometer, and/or a gyroscope.

Example 225 is the non-transitory computer readable medium of any one of Examples 199 to 224, wherein the warning includes at least one of a visual indication, an audible indication, and/or a haptic feedback configured to alert the cyclist of the risk probability.

Example 226 is the non-transitory computer readable medium of any one of Examples 199 to 225, wherein the warning includes a movement instruction configured to respond to the risk probability.

Example 227 is the non-transitory computer readable medium of Example 226, wherein the movement instruction includes a slowing instruction to slow a speed of the cyclist in the next road segment.

Example 228 is the non-transitory computer readable medium of Example 227, wherein the slowing instruction is configured to disable a motive force associated with the cyclist.

Example 229 is the non-transitory computer readable medium of either Example 227 or 228, wherein the slowing instruction is configured to apply a brake associated with the cyclist.

Example 230 is the non-transitory computer readable medium of any one of Examples 226 to 229, wherein the movement instruction includes a turning instruction to turn a steering mechanism associated with the cyclist.

Example 231 is the non-transitory computer readable medium of any one of Examples 226 to 230, wherein the movement instruction depends on the risk probability and a control loss factor associated with the environment.

Example 232 is the non-transitory computer readable medium of Example 231, wherein the control loss factor depends on a measured deceleration of the cyclist in response to the movement instruction.

Example 233 is the non-transitory computer readable medium of either Example 231 or 232, wherein the control loss factor depends on a posture of the cyclist.

Example 234 is the non-transitory computer readable medium of any one of Examples 231 or 233, wherein the control loss factor depends on a road condition of the next road segment.

Example 235 is the non-transitory computer readable medium of Example 234, wherein the road condition includes at least one of a road damage to the next road segment, a wetness level of the next road segment, and/or a geometry of the next road segment.

Example 236 is the non-transitory computer readable medium of any one of Examples 199 to 235, wherein the cyclist includes a pedestrian operating a bicycle.

Example 237 is the non-transitory computer readable medium of any one of Example 236, wherein the bicycle is an electric bicycle or a motorized bicycle.

Example 238 is a non-transitory computer readable medium, comprising instructions which, if executed, cause one or more processors to receive first information indicative of a head position of a pedestrian. The instructions also cause the processor to receive second information indicative of an environment of the pedestrian. The instructions also cause the processor to determine, based on the first information, a field of view of the pedestrian. The instructions also cause the processor to determine, based on the field of view and the environment, an expected trajectory of the pedestrian in a next road segment. The instructions also cause the processor to determine, based on the field of view and the environment, a risk probability for the expected trajectory of the pedestrian in the next road segment. The instructions also cause the processor to generate an instruction to transmit a warning to the pedestrian if the risk probability exceeds a threshold value.

Example 239 is the non-transitory computer readable medium of Example 238, wherein the instructions also cause the processor to determine the expected trajectory of the pedestrian based on a duration of time the field of view is along a possible trajectory of the pedestrian.

Example 240 is the non-transitory computer readable medium of either of Examples 238 or 239, wherein the instructions also cause the processor to determine the expected trajectory of the pedestrian based on a posture of the pedestrian indicating a possible trajectory of the pedestrian.

Example 241 is the non-transitory computer readable medium of Example 240, wherein the posture includes a head rotation of the pedestrian toward a possible trajectory of the pedestrian.

Example 242 is the non-transitory computer readable medium of Example 240, wherein the posture includes an arm signal of the pedestrian indicating a possible trajectory of the pedestrian.

Example 243 is the non-transitory computer readable medium of any one of Examples 238 to 242, wherein the instructions also cause the processor to determine the expected trajectory of the pedestrian based on received map information associated with a geographic location of the pedestrian and/or a possible trajectory of the pedestrian.

Example 244 is the non-transitory computer readable medium of Example 243, wherein the instructions also cause the processor to correlate the map information with the first information to estimate a focus probability that the pedestrian is focused on the expected trajectory.

Example 245 is the non-transitory computer readable medium of any one of Examples 238 to 244, wherein the instructions also cause the processor to determine the expected trajectory of the pedestrian based on information indicative of at least one of a direction of travel of the pedestrian, a speed of the pedestrian, and/or an acceleration of the pedestrian.

Example 246 is the non-transitory computer readable medium of any one of Examples 238 to 245 further including a receiver coupled to the processor, wherein the instructions cause the receiver to wirelessly receive the first information and/or the second information.

Example 247 is the non-transitory computer readable medium of any one of Examples 238 to 246, wherein causing the receiver to wirelessly receive the first information and/or the second information includes wirelessly receiving the first information and/or the second information using at least one of a V2X protocol, a WiFi protocol, and/or a Bluetooth protocol.

Example 248 is the non-transitory computer readable medium of any one of Examples 238 to 247, further including a transmitter coupled to the processor, wherein the instructions cause the transmitter to wirelessly transmit the warning.

Example 249 is the non-transitory computer readable medium of any one of Examples 238 to 248, wherein the instructions also cause the processor to determine a plurality of possible trajectories for the pedestrian and, for each possible trajectory of the plurality of possible trajectories, determine a path score and/or probability associated with the possible trajectory, and determine the next road segment and the expected trajectory based on the path scores and/or probabilities.

Example 250 is the non-transitory computer readable medium of Example 249, wherein the instructions also cause the processor to determine, for each possible trajectory of the plurality of possible trajectories, a risk score associated with the possible trajectory, wherein the risk score is based on the field of view of the pedestrian.

Example 251 is the non-transitory computer readable medium of Example 250, wherein the risk score is based on a safety model associated with the environment, wherein the safety model includes an unstructured safety model or a structured safety model.

Example 252 is the non-transitory computer readable medium of Example 251, wherein the risk score is based on at least one of a number of objects in the environment, a distance of the pedestrian from the objects, a speed of the objects, a trajectory of the objects, an acceleration of the objects, the expected trajectory of the pedestrian, a speed of the pedestrian, an acceleration of the pedestrian, and/or a road geometry of the next road segment.

Example 253 is the non-transitory computer readable medium of any one of Examples 238 to 252, wherein the risk probability is further based on a learning model associated with the pedestrian, wherein the learning model is based on comparisons of the expected trajectory to an actual movement of the pedestrian over a plurality of road segments.

Example 254 is the non-transitory computer readable medium of Example 253, wherein the learning model includes at least one of a data-based learning model and/or a formula-based learning model.

Example 255 is the non-transitory computer readable medium of Examples 253 or 254, wherein the instructions also cause the processor to receive the learning model from a cloud-based server or to transmit the comparisons to the cloud-based server.

Example 256 is the non-transitory computer readable medium of any one of Examples 238 to 255, wherein the instructions also cause the processor to determine an awareness score of the pedestrian based on a focus point of the pedestrian, wherein the focus point is based on at least one of the field of view of the pedestrian, a head position of the pedestrian, and/or an eye position of the pedestrian.

Example 257 is the non-transitory computer readable medium of Example 256, wherein the awareness score includes an expected response time of the pedestrian, wherein the expected response time is based on a correlation of the focus point with the expected trajectory.

Example 258 is the non-transitory computer readable medium of any one of Examples 238 to 257, wherein the risk probability is associated with a detected object within the expected trajectory.

Example 259 is the non-transitory computer readable medium of any one of Examples 238 to 258, wherein the first information includes a camera image associated with a head position of the pedestrian.

Example 260 is the non-transitory computer readable medium of Example 259, wherein the instructions also cause the processor to receive the camera image from a forward-facing camera aligned with the head position of the pedestrian.

Example 261 is the non-transitory computer readable medium of either Example 259 or 260, wherein the instructions also cause the processor to receive the camera image from a pedestrian-facing camera that faces the pedestrian.

Example 262 is the non-transitory computer readable medium of any one of Examples 238 to 261, wherein the second information includes sensor information received from a sensor of the pedestrian, wherein the sensor includes at least one of a back-facing sensor configured to sense an area behind the pedestrian, a front-facing sensor configured to sense an area in front of the pedestrian, a body sensor configured to sense a pose, position, and/or a touch location of the pedestrian, and/or a side-facing sensor configured to sense an area beside the pedestrian.

Example 263 is the non-transitory computer readable medium of Example 262, wherein the sensor includes at least one of a camera, a light detection and ranging sensor, a radar sensor, a positioning sensor, a touch sensor, an accelerometer, a magnetometer, and/or a gyroscope.

Example 264 is the non-transitory computer readable medium of any one of Examples 238 to 263, wherein the warning includes at least one of a visual indication, an audible indication, and/or a haptic feedback configured to alert the pedestrian of the risk probability.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. An apparatus comprising:
  a processor; and
  a communication system comprising a receiver that is communicatively coupled to the processor, wherein the processor is configured to:
  receive, via the receiver of the communication system, a first information indicative of a head position of a cyclist;
  determine, based on the first information, a field of view of the cyclist;
  receive, via the receiver of the communication system, a second information indicative of an environment of the cyclist, wherein the receiver is configured to wirelessly receive the first information and the second information according to at least one of a vehicle to everything (V2X) protocol, a WiFi protocol, or a Bluetooth protocol;
  determine, based on the field of view and the environment, an expected trajectory of the cyclist in a next road segment;
  determine, based on the field of view and the environment, a risk probability for the expected trajectory of the cyclist in the next road segment; and
  generate an instruction to transmit a warning to the cyclist if the risk probability exceeds a threshold value.

2. The apparatus of claim 1, wherein the processor is further configured to determine the expected trajectory of the cyclist based on a duration of time the field of view is along a possible trajectory of the cyclist.

3. The apparatus of claim 1, wherein the processor is further configured to determine the expected trajectory of the cyclist based on a posture of the cyclist indicating a possible trajectory of the cyclist.

4. The apparatus of claim 3, wherein the posture comprises a head rotation and/or an arm signal of the cyclist toward a possible trajectory of the cyclist.

5. The apparatus of claim 4, wherein the processor is further configured to correlate received map information associated with a geographic location of the cyclist and/or a possible trajectory of the cyclist with the first information to estimate a focus probability that the cyclist is focused on the expected trajectory.

6. The apparatus of claim 1, wherein the processor is further configured to determine a plurality of possible trajectories for the cyclist and, for each possible trajectory of the plurality of possible trajectories, determine a path score associated with the possible trajectory, and determine the next road segment and the expected trajectory based on the path scores and/or probabilities.

7. The apparatus of claim 6, wherein the processor is further configured to determine, for each possible trajectory of the plurality of possible trajectories, a risk score associated with the possible trajectory, wherein the risk score is based on the field of view of the cyclist.

8. The apparatus of claim 7, wherein the risk score is based on at least one of a number of objects in the environment, a distance of the cyclist from the objects, a speed of the objects, a trajectory of the objects, an acceleration of the objects, the expected trajectory of the cyclist, a speed of the cyclist, an acceleration of the cyclist, and/or a road geometry of the next road segment.

9. The apparatus of claim 1, wherein the risk probability is further based on a learning model associated with the cyclist, wherein the learning model is based on comparisons of the expected trajectory to an actual movement of the cyclist over a plurality of road segments.

10. The apparatus of claim 1, wherein the first information comprises a camera image associated with a head position of the cyclist, wherein the processor is configured to receive the camera image from a forward-facing camera aligned with the head position of the cyclist.

11. The apparatus of claim 1, wherein the warning comprises at least one of a visual indication, an audible indication, and/or a haptic feedback configured to alert the cyclist of the risk probability.

12. The apparatus of claim 1, wherein the warning comprises a movement instruction configured to disable a motive force associated with the cyclist.

13. The apparatus of claim 1, wherein the warning comprises a movement instruction configured to apply a brake associated with the cyclist.

14. The apparatus of claim 13, wherein the movement instruction depends on the risk probability and a control loss factor associated with the environment.

15. The apparatus of claim 14, wherein the control loss factor depends on a road condition of the next road segment, wherein the road condition comprises at least one of a road damage to the next road segment, a wetness level of the next road segment, and/or a geometry of the next road segment.

16. A non-transitory computer readable medium, comprising instructions which, if executed, cause one or more processors to:
  receive, via a receiver of a communication system coupled to the one or more processors, first information indicative of a head position of a pedestrian;
  receive, via the receiver of the communication system, a second information indicative of an environment of the pedestrian, wherein the receiver is configured to receive the first information and the second information according to at least one of a vehicle to everything (V2X) protocol, a WiFi protocol, or a Bluetooth protocol;
  determine, based on the first information, a field of view of the pedestrian;
  determine, based on the field of view and the environment, an expected trajectory of the pedestrian in a next road segment;
  determine, based on the field of view and the environment, a risk probability for the expected trajectory of the pedestrian in the next road segment; and
  generate an instruction to transmit a warning to the pedestrian if the risk probability exceeds a threshold value.

17. The non-transitory computer readable medium of claim 16, wherein the instructions further cause the one or more processors to determine an awareness score of the pedestrian based on a focus point of the pedestrian, wherein the focus point is based on at least one of the field of view of the pedestrian, a head position of the pedestrian, and/or an eye position of the pedestrian.

18. The non-transitory computer readable medium of claim 17, wherein the awareness score comprises an expected response time of the pedestrian, wherein the expected response time is based on a correlation of the focus point with the expected trajectory.

19. The non-transitory computer readable medium of claim 16, wherein the second information comprises sensor information received from a sensor of the pedestrian, wherein the sensor comprises at least one of a back-facing sensor configured to sense an area behind the pedestrian, a front-facing sensor configured to sense an area in front of the pedestrian, a body sensor configured to sense a pose of the pedestrian, and/or a side-facing sensor configured to sense an area beside the pedestrian.

\* \* \* \* \*